United States Patent [19]

Fiorenza

[11] 4,114,026

[45] Sep. 12, 1978

[54] ELECTRONIC DESK-TOP ACCOUNTING MACHINE AND CALCULATOR

[75] Inventor: Giorgio Fiorenza, Milan, Italy

[73] Assignee: Ing. C. Olivetti & C., S.p.A., Ivrea (Turin), Italy

[21] Appl. No.: 722,506

[22] Filed: Sep. 13, 1976

[30] Foreign Application Priority Data

Sep. 15, 1975 [IT] Italy ............................ 69284 A/75

[51] Int. Cl.² .................... G06K 17/00; G01R 31/30
[52] U.S. Cl. .................................. 235/375; 364/406; 364/200
[58] Field of Search ............... 235/61.6 R, 61.9 R, 235/61.9 A, 168 R, 153 A, 153 B, 159, 61.6 J, 376, 375; 365/76, 190; 364/406, 200; 197/19, 20

[56] References Cited

U.S. PATENT DOCUMENTS

| 3,265,874 | 8/1966 | Soule | 235/153 B |
| 3,348,215 | 10/1967 | Soule | 364/406 |
| 3,643,077 | 2/1972 | Griggs | 235/168 |
| 3,711,690 | 1/1973 | Osborne | 235/153 B |
| 3,860,793 | 1/1975 | Roe | 235/61.6 J |
| 3,932,843 | 1/1976 | Trelut | 235/153 B |

*Primary Examiner*—Robert M. Kilgore

*Attorney, Agent, or Firm*—Schuyler, Birch, Swindler, McKie & Beckett

[57] ABSTRACT

An electronic desk-top accounting machine is adapted to operate in the usual programmed mode as well as in a manual mode as an arithmetic calculator. It comprises a keyboard for entering numeric data and operative commands, a printing unit, a programming unit and an electronic data processing unit. A working memory contains data and processing results arising during execution of the accounting program. There are provided a selector switch for selecting the operating mode, programmed or manual, and a preserving memory. The execution of the accounting program can be interrupted, upon actuation of the selector switch, for enabling the use as an arithmetic calculator, while the content of the working memory is transferred into the preserving memory. The execution of the program can be resumed upon request and will take place from the data and processing results present in the working memory on the interruption of the execution of the program. On the resumption of the program, the printing unit is automatically brought back to the same position in which it was on the stopping of the program.

The program is supported on one or more removable mechanical drums whose loading is indicated by a two-digits display.

17 Claims, 19 Drawing Figures

| | | | | | | | | | | | | | | |
|---|---|---|---|---|---|---|---|---|---|---|---|---|---|---|
| | | | | | | ← | S - R E G I S T E R | | | | | → | | |
| OPMASK | IK1 | IK2 | KYPRE1 | KYPRE2 | PTPAT1 | PTPAT2 | RIGAT1 | RIGAT2 | PAGE1 | PAGE2 | PC1 | PC2 | RETAD1 | RETAD2 | SS |
| CSTR1 POSFU1 | CSTR2 POSFU2 | CNBUF1 | CNBUF2 | SERVIN | S1PUNTO | S2NTOTST | EDIT | POSAT1 | POSAT2 | DATE ||||
| DEPST1 | DEPST2 | SERC | SERKEY | SACRO | CONDIS | BARRA | NROT | ARROT | TIPOPE | ASSMAC | CKDFV | CRTFIL | TIPCNT | INDRO | SERVOP |
| TEMP | LENGHT | PRECHD | DIGT | PREDIP | INDEX | NTOTINREG | NDECDAREG | VAREG | SWARRT TOTDEC DECST1 | POSBL1 NSHIFT DECST2 | POSBL2 INDCIF DEPIN1 | INDCIF NCFMRE DEPIN2 | CNLOOP CIFFDO DEPCR1 | LCONT BLARUN DEPCR2 | DEVIRG D'ARRUNI |
| DØRS5 CKDIO | INCIFR | | 164 | 162 | 161 | | NCFCKD | MODULE | MOD1 | INDFIS | INDPRO | | CNTCIF |
| LEVEL | LV1 | | LV2 | | LV3 | | LV4 | | LV5 | | | | | | |

FIG. 7

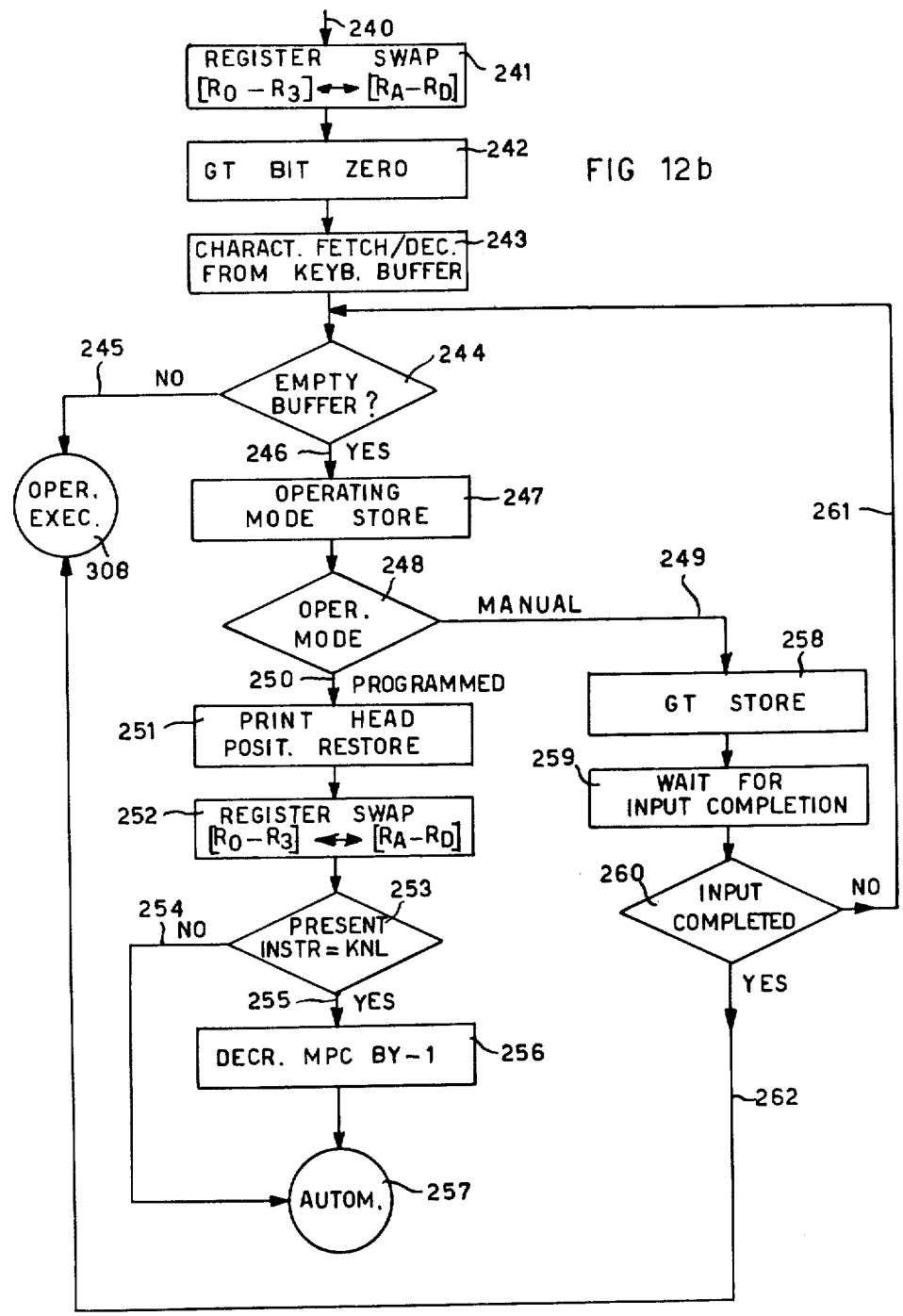

ELECTRONIC DESK-TOP ACCOUNTING MACHINE AND CALCULATOR

BACKGROUND OF THE INVENTION

1. Field of the Invention

The present invention relates to an electronic desk-top accountting machine, with a recorded program, adapted to operate also as a calculator.

2. Description of the Prior Art

Programmed electronic accounting machines are known, which are endowed with high programming capabilities and therefore are able to execute sophisticated accounting programs. They are obviously very costly and can be operated only by specialized operators whose training is relatively long and expensive. Owing to their high cost per hour, these machines can be economically employed only for processing rather complicated accounting works. Electro-mechanical accounting machines are since longer known, which had lower operating capabilities, such as low computing speed and fixed programming, but which could be more easily operated as they did not need specialized operators. These machine rented for a relatively low cost per hour, it is not so imperative to use them continuously and in many cases they were actually used, at intervals, also as simple adding/substracting calculators.

A shortcoming was in these cases that the operation as simple adding/substracting calculator was not possible if a programmed work was being executed,, under penalty of losing the programmed work already done.

SUMMARY OF THE INVENTION

It is an object of the present invention to provide an electronic desk-top accounting machine which, selling at a price relatively low and competitive with that of conventional electromechanical machines, features programming flexibility, operating speed, easy use and compact size of electronic accounting systems. It is another object of the present invention to provide an electronic desk-top accounting machine, which is operable both in a programmed mode, as a programmable accounting unit, and in a manual mode, as an arithmetic calculator, in which the manual mode of operation can be selected and obtained at any time, by the operator, without impairing the execution of an accounting program being incidentally worked out, which consequently remains only temporarily interrupted and can be continued, after the programmed mode has been again selected, restarting from the interruction point. In other words the invention makes it possible to interrupt operation in the programmed mode at practically any instant and change to the manual mode for the timely working out of arithmetical calculations; the machine can be returned immediately to the programmed mode as soon as the calculations have been completed, without any of the programmed works carried out before the interruption being lost and the program and the work being resumed exactly from the point at which they were interrupted.

It is thus possibie to satisfy economically, with a single machine, the requirements of continuity of accounting jobs while allowing arithmetical calculations to be performed irregularly, as and when required.

Another object of the present invention is to provide an electronic desk-top accounting machine, adapted to operate both in a programmed and in a manual mode of operation according to the position of a selector switch, such that, for the convenience of executing offhand arithmetic calculations, it can be switched into the manual mode of operation also during the execution of a program, without prejudice for program resumption after the temporary interruption of said calculations.

It is another object of the present invention to provide an electronic desk-top accounting machine featuring, in addition to the usual programmed mode of operation, a manual mode in which it can be used as a conventional desk-top arithmetic calculator, and having, accordingly, a printing unit with the platen divided into two sections, respectively corresponding to the two aforesaid modes, one of which being used when the machine operates as an accounting machine and the other one being used when the machine operates as a calculator.

A further object of the present invention is to provide a desk-top accounting machine operable also as a calculator, therefore featuring two modes of operation, and equipped with a printer comprising a printing head movable on a fixed platen which is split into two sections, one reserved to the accounting work and the other one to the calculating work said printing head being automatically positioned on the proper section of the platen when the machine is switched into one of the two aforesaid modes of operation, and moreover, when a programmed accounting work is restarted, after having being momentarily interrupted for enabling the operation of the machine as a desk-top calculator, said printing head is automatically set on the same printing position as it occupied before the interruption.

It is another object of the present invention to provide an electronic desk-top accounting machine endowed with a programming language and a programming support which is very easy to be learnt and to be understood and therefore does not need a skilled programmer to be put to work.

An object of the present invention is also to set up a programmed desk-top accounting machine whose program is registered on a physical support which can be easily read by the operator, if it is required, and which can be easily rectified when some programmed instruction registered thereon is wrong.

Another object of the present invention is to supply a programmed desk-top accounting machine, comprising a program reading unit, and having the program registered on standard modules, mechanically interchangeable, which can be easily loaded into and unloaded from said unit.

It is a further object of the present invention, to supply a programmed desk-top accounting machine, endowed with a two-digits display, which is adapted to direct the operator when loading the subsequent program-modules in which a complex program is possibly divided.

BRIEF DESCRIPTION OF THE DRAWINGS

The invention will be described in more detail, by way of example, with reference to the accompanying drawings, in which:

FIG. 7 is a diagram of a reserved memory zone (ZRM) of the RAM of FIG. 6;

FIGS. 12a, 12b, 13a and 13b are flow diagrams illustrating the initialization of the machine in the manual and automatic modes;

DETAILED DESCRIPTION OF THE PREFERRED EMBODIMENT

Figure 2:
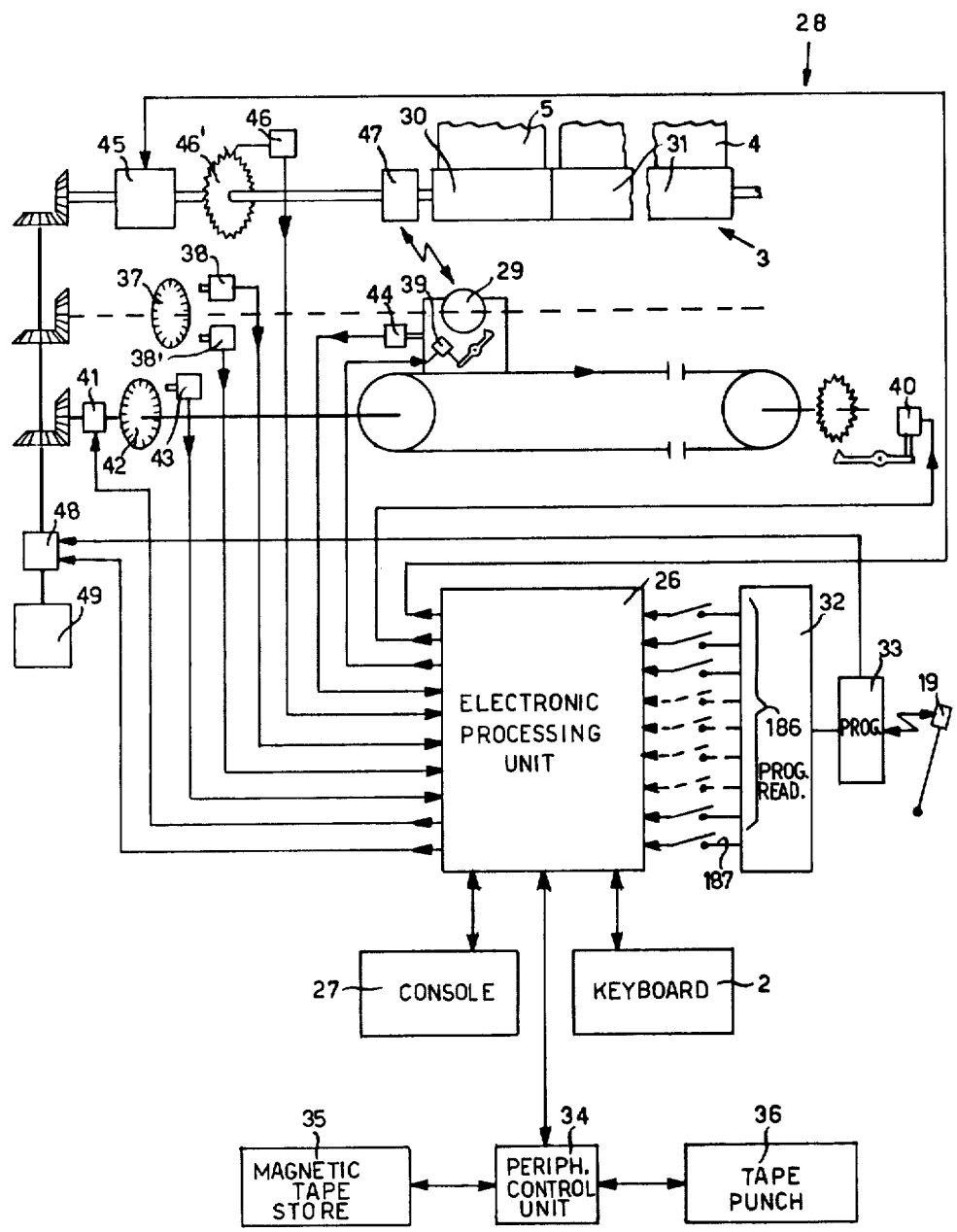
FIG. 2 is a general diagram of the electronic and mechanical components and their connections in the machine of FIG. 1.

Referring to FIG. 2, a digital recorded-program accounting machine and calculator printing on a roll is composed of the following main parts:

An electronic processing unit 26; an operating console 27 for prearranging the operation of the machine and visually displaying the information needed by the operator; a keyboard 2 for introducing numerical data and entering arithmetical functions; a printing unit 28 for printing the processing results on paper, comprising a movable print head 29 and a fixed platen 3 divided into two sections 30 and 31, of which the section 30, on the operator's left is used when the machine is working as a calculator, while the other section 31, on the operator's right, is used when the machine is working as an accounting machine.

Figure 4:
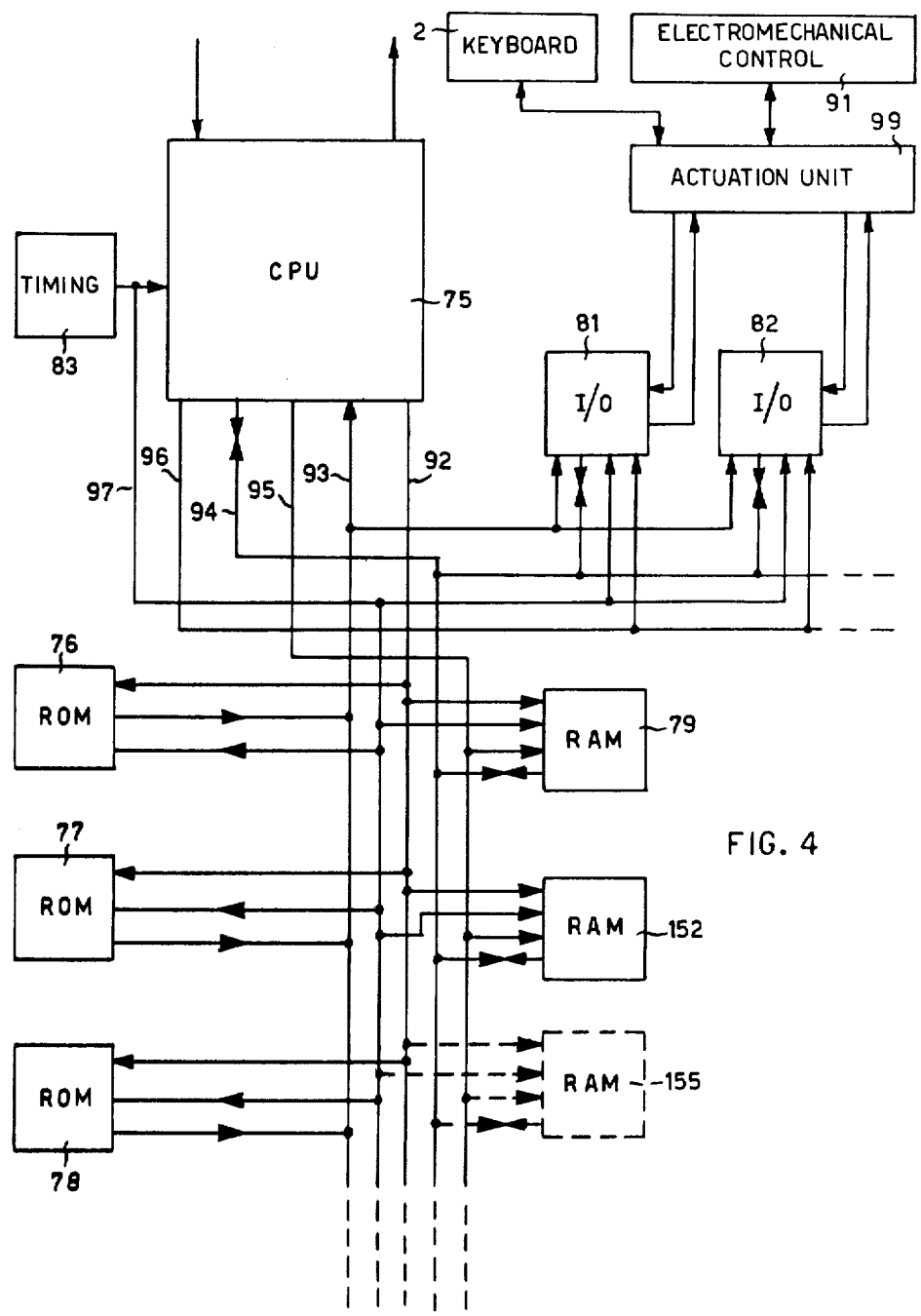
FIG. 4 is a diagram of a number of connections between electronic units of the machine of FIG. 1.

The machine furthermore comprises a program reading unit 32 connected to the electronic processing unit 26 by means of eight lines 186 for reading the instructions, plus a synchronizing line 187, and adapted to read a program carrier 33 and to introduce the program into a memory 152, 155 (FIG. 4) of the processing unit 26 and a group of optional units comprising a control unit 34, a magnetic tape data recorder 35 and a tape punch 36.

Electronic Processing Unit

The electronic unit 26 of the accounting machine and calculator is, in the preferred embodiment, realised as a microprogrammed microprocessor of the type known at present in the art to be found on the market.

Such a microprocessor comprises an assembly of standard integrated circuits belonging to the same family and each integrated on a single chip in accordance with MOS/LSI technology. More particularly, referring to FIG. 4, the monolithic circuits of the microprocessor which is considered here are the following: a central unit, or "CPU," 75, a series of read-only memories, or ROMs, 76, 77 and 78, a series of random access read/write memories, or RAMs, 79, 152 and 155, a set of input/output or I/O interface units 81 and 82 which connect the CPU 75 through the medium of an adaptation and actuation unit 99 to the keyboard 2 and to the electromechanical control units 91 of the machine, and a timing circuit 83.

Due to the use of Large Scale Integration (LSI) electronic components, the machine is contained entirely in a body of very small overall dimensions entirely comparable with those of a conventional desk-top calculator, for which reason the normal installation anticipated is support on a desk top.

Connection between these monolithic circuits is achieved by the known technique of common distribution lines or bus-bars, for which the circuits themselves are already prearranged.

The items of information which are to be exchanged between the aforesaid basic circuits are essentially of three types: addresses, instructions and data; for the distribution of each of these types of information there is provided a suitable distribution line (bus) composed of a certain number of wires equal to the number of bits to be handled in parallel, namely, respectively, twelve wires for the address bus 92, eight wires for the instruction bus 93 and four wires for the data bus 94, corresponding to the fact that an address is a code of 12 bits in parallel, an instruction is an eight-bit byte and a unit of data is a word (either a word or a digit) of four bits. Moreover, there is a one-wire line 95 for the transmission of the writing in memory command from the CPU to the RAMs, and another line 96, also of one wire, for the distribution of the corresponding enabling signal from the CPU to the I/O units. Finally, a two-wire line 97 provides for the distribution of two-phase timing pulses.

The microprogram which effects control of the machine is a sequence of microinstructions each constituted by a byte of eight bits in parallel and written inerasably in the ROMs 76–78; each ROM memory "cell" contains in fact a byte of eight bits; when the ROM is interrogated, the byte contained in the cell addressed appears on the instruction bus 93; to each cell of the ROMs 76–78 of the system there corresponds a particular code of 12 bits or address and in order to address a given cell of the ROMs it is sufficient to cause the corresponding address thereof to appear at an appropriate time on the address bus 92. Since the address bus 92 is used in common by the ROMs and the RAMs, the allocation of the address code is effected by means of the timing, which provides two separate time intervals for the ROMs and RAMs, during which the general address code is activated in the ROM or the RAM, respectively.

An individual chip of the ROMs 76–78 contains 1024 = $2^{10}$ bytes and 10 address bits will therefore be sufficient to address all the cells of a ROM; $2^2 = 4$ ROM chips can therefore be addressed directly by means of the other two address bits; in other words, one of 4096 ROM cells can be addressed with the 12 bits of the address. Within the limits of a ROM chip (containing $2^{10}$ bytes) there are defined $2^4 = 16$ "ROM pages" each containing $2^6 = 64$ bytes; specifically, the individual byte within the generic ROM page is addressed by means of the six least significant bits of the aforesaid 10 address bits, while the individual ROM page within the generic ROM chip is addressed by means of the other four bits; in other words, there are defined as belonging to the same ROM page all those bytes whose address codes present identical configurations of the respective six most significant bits, while all the ROM pages comprising bytes whose address codes present identical configurations of the respective two most significant bits belong to the same ROM chip.

An individual chip or "page" of the RAMs 79, 152, 155, on the other hand, contains $2^8 = 256$ cells each with a capacity of one word (or 4-bit words) and, therefore, $2^4 = 16$ RAM chips can be addressed by means of the 12-bit address, since the twelve-bit address can again select one of 4096 cells. Each Ram page is moreover arranged in 16 registers (numbered from 0 to 15) or "lines" each containing, in 16 cells, as many words or "digits", these being also numbered from 0 to 15. In the basic configuration, the machine is normally provided with the two RAM chips 79 and 152 (FIG. 6) respectively constituting the RAM page "0" and page "1," which are organized or arranged in the following manner.

The page "0," 79, comprises a reserved memory zone (ZRM) 143, that is a part of the RAM reserved exclusively for the microprogram and not accessible to the programmer, an assembly 154 of seven working registers $R_0$-$R_6$ (132-138), and a keyboard buffer 139 with capacity of two registers.

The reserved memory zone ZRM, 143, which has a total capacity equivalent to seven registers, comprises a service register S, 142, a stack subroutine register 140, a print buffer 141 with a capacity of 26 characters corresponding to 26 words, a date register 153 with a capacity of six words and, finally, a suitable number of memories having a capacity generally not greater than two words, which are employed as counters, switching elements, flip-flops, etc., some prearranged to store, at successive times, conditions or numbers relating respectively to different events or quantities, the function of which will be defined as necessary.

The RAM page "1," 152, comprises an assembly of preserving registers $R_A$, $R_B$, $R_C$, $R_D$ (144, 145, 146, 147) and the program memory 80 intended for storing the program.

Normally, four preserving registers ($R_A$-$R_D$) are provided and the program memory 152 has a capacity equivalent to 12 registers, that is $12 \times 16 : 2 = 96$ bytes; in this case, the first cell of the RAM page 1 which can be occupied by the program has the address $4 \times 16 = 64$, the cells having the addresses 0-63 forming the preserving registers.

At the expense of the capacity of the program memory 80 the assembly of the registers of page "1" may be extended by defining another four registers $R_E$, $R_F$, $R_G$, $R_H$ (148, 149, 150, 151), in general for the purpose of increasing the capacity of the machine to store constant data or complex intermediate processing results; in this case, the address of the first cell of the RAM page 1 which can be occupied by the program is 128 and the capacity of the program memory 80 falls from 96 to 64 bytes.

In an extended configuration of the machine there is added a third RAM chip 155 (constituting the RAM "page 2"), which increases the capacity of the program memory 80 by 128 bytes. bringing it to a total of 224 bytes (or 192 bytes).

As regards the microinstructions, although with eight bits $2^8 = 256$ different bytes can be distinguished only some tens of microinstructions are to be recognized, since many of these constitute in reality groups of microinstructions which are functionally identical, but different from one another simply because of a different numeric value relating to some operand (for example: the address of a ROM cell to be operated on).

More particularly, the interface circuits 81-82 (FIG. 4) serve for the exchange of data and control information with devices outside the electronic processing unit; each is connected to the data distribution bus, to the I/O enabling signal line and to the timing circuit and is moreover provided with 12 high-impedance inputs and 12 discrete static oututs for the input and output, respectively, of information from and to the said external devices (such as the keyboard 2 (FIG. 2), the printer 28, the program reader 32, etc.).

The timing circuit 83 (FIG. 4) generates the timing signals with two periodic square waves of like frequency and different phase by the logical combination of which there are defined $2^2 = 4$ basic time intervals T1, T2, T3, T4 which time the logical operations of the various chips.

Figure 5:
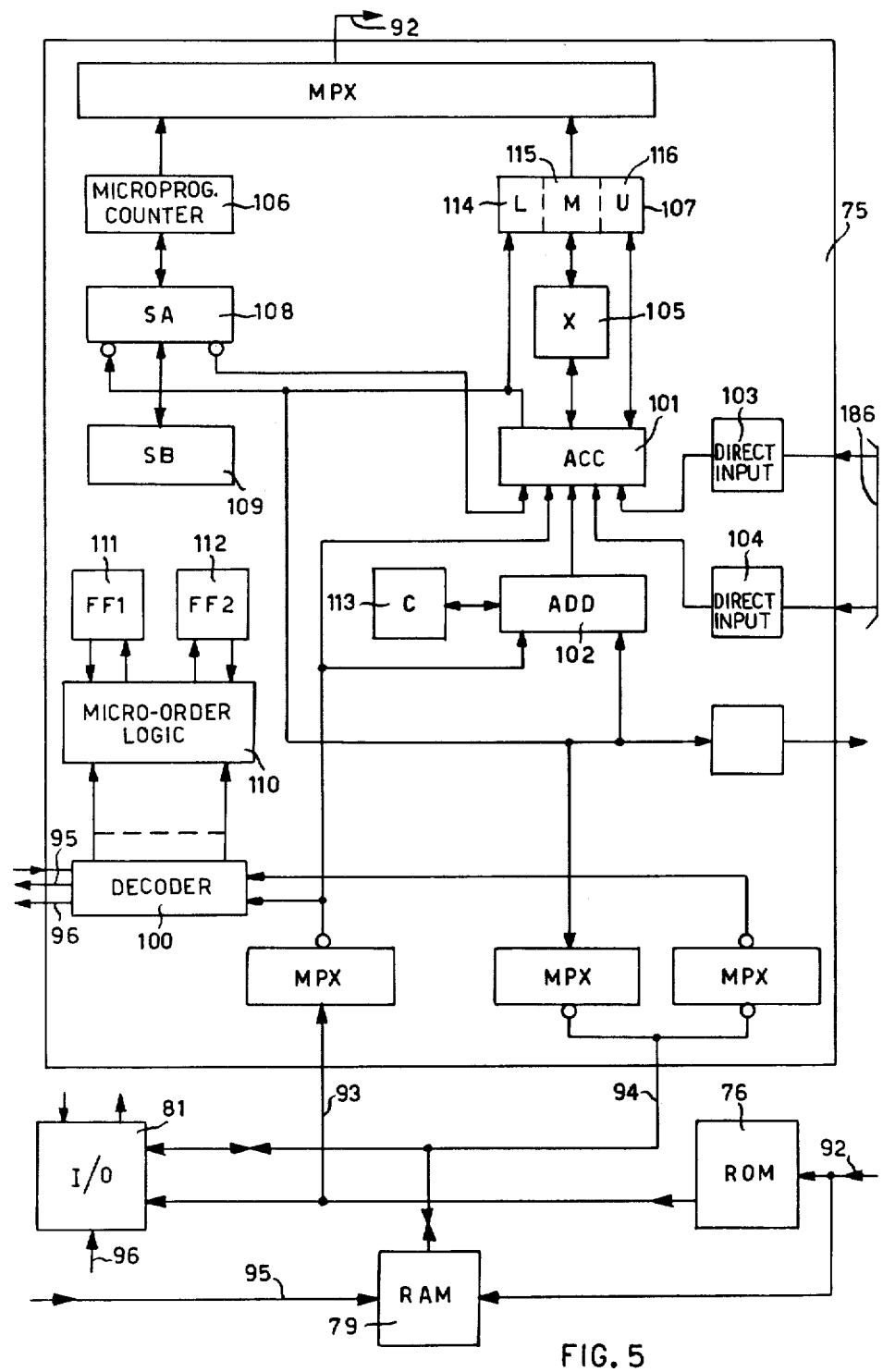
FIG. 5 is a block diagram of a central processing unit (CPU) of FIG. 4.

The central unit 75 (FIG. 5) is a parallel 4-bit (word) processor microprogrammed with microinstructions of 1 byte (8 bits), which comprises a microinstruction decoder 100, an accumulator register 101 with a parallelism of four, and an adder 102, also with a parallelism of four, provided with a carry flip-flop C, 113. Two circuits 103 and 104 for direct input to the CPU are adapted to transfer directly to the accumulator, in two operating cycles, two words of four bits each, constituting an 8-bit byte present on a suitable channel 186 for direct input to the CPU. An auxiliary register X, 105 is capable of storing one word. A 12-bit counter register 106 is used for forming and storing the ROM addresses, acting as a microprogram counter and complete with a device for incrementing the binary number contained therein by +1, as necessary for the sequential reading of the microprogram. Another 12-bit counter register 107 complete with a device for incrementing the binary number contained therein by +1, is used for forming and storing the RAM addresses and is divided into three 4-bit sections, of which the least significant L, 114 is intended for addressing the individual word or digit of a 16-digit RAM register, the intermediate section M, 115 is intended for addressing the individual register of a 16-register RAM page and the most significant section U, 116 is intended for addressing the RAM page. Two 12-bit registers SA 108 and SB 109 are used for preserving the ROM addresses contained in the counter register 106, for obtaining two nesting levels of subroutines of microinstructions. Two individual control flip-flops FF1 111 and FF2 112 are used as described below. A logic circuit 110 converts the decoded microinstructions into the microorders capable of executing them, under control of the timing signal decoder (not indicated in the drawings).

DETAILED DESCRIPTION OF THE CPU

The microinstruction decoder 100 contains the logic for decoding the microinstructions and supplying the control signals relating to the transfer of the data, the arithmetical operations and the logical sequences.

The microinstructions are classifiable as follows: arithmetical, logical, data transfer, microprogram control transfer, interface and special; moreover, "long" microinstructions, composed of two consecutive bytes, are defined.

The adder 102 is of the 4-bit parallel binary type and the carry flip-flop C 113 is adapted to store both the carry bit from the lower numeric order and the carry bit intended for the higher order. The adder 102, together with the 4-bit accumulator 101, constitute the arithmetic and logic section of the CPU 75; the microinstructions relating to the logical and arithmetical operations that the CPU recognizes are all of a single byte and directly enable arithmetical operations between the accumulator and the data stored in the RAM and ROM memories.

In addition to its arithmetical functions, the accumulator 101 is in the main working register of the CPU 74 and is also the temporary transit (buffer) store for almost all the data which is transferred from one location to another within the system; during the internal transfers of data, the accumulator 101 acts as a buffer for the RAMs and ROMs, and during the exchanges of data with the outside, the accumulator 101 acts as a buffer both for the data to be transmitted and for the data received. The accumulator 101 moreover performs the function of an input staticizing register in relation to the direct input channel 186, which is prearranged to be able to introduce data coming from outside directly into the CPU. This channel is provided for an 8-bit byte divided into two words WA and WE of four bits, each of which is transferred separately through the circuits 103 and 104 to the accumulator 101 through the agency of specific microinstructions DIA and DIB.

The register 105 also having a capacity of one word serves as a temporary data store (buffer) as an aid to the accumulator 101.

The 12-bit register 107 is divided, as has been said, into three sections. The section L 114, in addition to being a register, is also a counter and its contents can be incremented or decremented by one under the control of the microprogram, which allows the RAM registers (comprising 16 words or digits) to be explored sequentially. If the contents of the sections U116 and M 115 are modified by the microprogram, they allow a digit to be transferred from an original RAM location (defined by the section L 114 and by the original contents of U and M) to the corresponding location in another RAM page (defined by the new contents of U and M); during these operations of modification of the RAM addresses, the accumulator 101 and the auxiliary register 105 are employed for temporarily storing the eight bits of higher order (U, M) relating to the original RAM address, which bits must be retrieved it it is not wished to lose the current RAM address ("pointer").

The counter register 106 (12-bit) contains the address of the next to be executed microinstruction of the microprogram; the section corresponding to the six least significant bits of the register 106 constitutes an independent counter which is normally incremented by one at each microinstruction cycle. The six most significant bits identify the ROM chip and within this the page (the ROM page comprises 64 bytes and a ROM chip comprises 16 pages); these six bits can be modified only by means of microinstructions TL (transfer, long) or TML (transfer and storage, long).

The two preserving registers 108, 109 arranged as a two-level stacking device (stack) preserve the addresses of reentry from the micro-subroutines and allow two subroutine nesting levels; in order to enjoy a greater number of levels, a special microinstruction is available which concerns the first preserving register and the accumulator 101, allowing preservation in a RAM zone 140 devoted to the reentry addresses.

The flip-flops FF1 111, FF2 112 and the carry flip-flop C 113 associated with the adder 102 can be individually set, zeroized (reset) and examined by the microprogram; they serve as state indicators.

In order to represent the binary numbers corresponding to the 8-bit bytes of the microinstructions or to the 12-bit codes of the ROM or RAM addresses in a unified manner, use is made of hexadecimal notation by which the numbers can be expressed as two or three digits, respectively, profitting from the readiness of conversion of the numbers from the binary system (to the base of two) to the hexadecimal system (to the base of $2^4$) and vice versa; the hexadecimal system uses the following 16 digits: 0123456789ABCDEF.

On the other hand, in order to represent the codes (with 8 or 16 bits) of the instructions of the program of the machine (also called elsewhere macroinstructions of the macroprogram), octal notation is adpoted, profiting also in this case from the readiness of conversion of the numbers from the binary system to the octal system (to the base of $2^3$) and vice versa.

The sequences of microinstructions which are to be used several times in the microprogram are arranged in accordance with the known technique of subroutines, so as to be written therein once only and, on the other hand, to be able to be called therein as many times as are necessary by means of the simple programming, each time, of a single call microinstruction or at the most of a group of only a few call microinstructions.

Calling a subroutine means interrupting the normal flow of the microprogram to execute the instructions which constitute the routine and then returning to the microinstruction following the interruption.

There are seven nesting levels of the subroutines, two of which are obtained by means of the two address preserving registers 108, 109 of the central unit 75 and the other five of which can be obtained by means of a suitable routine (CALL) and a suitable sequence (IMPRET).

The Operating Console

The operating console 27 (FIG. 3) comprises a series of signalling and prearranging devices which the operator needs for checking and controlling the machine during its operation.

More particularly, the following are provided: A luminous ON/OFF push button 51 with a white light, indicating that the machine is switched on or off. This push button puts the machine in the switched-on ("ON") state and institutes an automatic zeroizing which initializes the processing unit.

An "error" lamp 52 with a red light, which is normally extinguished, lights up when errors both of entry and of execution occur.

A luminous alphanumeric visual display ("operator guiding display") 53 with seven luminous segments is adapted to guide the operator during the introduction of the data from the keyboard and for loading the program. There are 16 characters which can be visually displayed: the ten decimal digits (0–9) plus the characters A*b*C*d*EF, (the lower case *b* and *d* avoiding confusion with 8 and 0).

A two-position program selector 54 is sensed only in the case in which the machine is in the programmed mode and serves to start the processing on the program 1 (P1) or 2 (P2) recorded in memory, when the selector is sensed in execution of a suitable instruction.

A two-position machine mode selector 57 can be set to put the machine correspondingly in manual or programmed operation. The machine provides for testing the selector automatically at the request of the program in the initialization stage and in the programmed mode, after each instruction of introduction from the keyboard, KN or KNL, as will be described hereinafter.

A decimals selector 56 has significance and is tested only when the machine is in the manual mode. This testing takes place on the initiative of the microprogram every time the first digit of a number is struck and serves to check the number of decimals being entered and printed. More particularly, the selector 56 can adopt four positions corresponding respectively to "0," "2," "3" and "AND MODE," for a check known per se.

A rounding-off and accumulation selector 55 is also tested only when the machine is in the manual mode. The testing, which takes place on the initiative of the microprogram and only in correspondence with the first digit of an entered number, serves to effect the rounding off of the result. More particularly, the selector 55 can adopt eight positions, of which four positions are respectively for: "0," rounding off because of deficiency; "9," rounding off because of excess; "5," mathematical rounding off with addition of "5" to the most significant decimal digit to be discarded; and "$T$," rounding off to the unit, with addition of $1 - 10^{-n}$ to the number to be rounded off, where $n$ = number of decimals. The other four positions, which are marked by the symbol "A" added to the four symbols already described, activate automatic accumulation in the "grand total" register of the partial totals and of the results of multiplications or divisions, that is by qualifying the total function key T 64 and the equals function key = 68 so that the striking of the key T 64, in addition to printing the contents of the accumulator register, also produces the algebraic accumulation thereof in the "grand total" register 135, and, respectively, the striking of the key = 68 produces the algebraic accumulation in the "grand total" register 135 of the result of the multiplication or division to which this striking relates.

Figure 1:
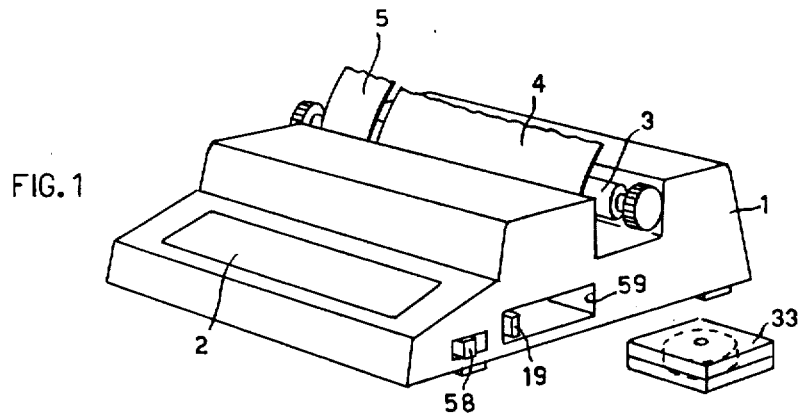
FIG. 1 is a diagrammatic prespective view of a machine embodying the invention.

The machine 1 (FIG. 1) is moreover provided with a selector switch 58 for the introduction of the program either from the keyboard 2 or from the program carrier 33, and with a program loading key 19 (FIG. 1) which starts the loading of the program on the carrier 33 into the memory on the insertion of the program carrier 33 into a recess 59 of the machine, substantially as described in the U.S. patent application Ser. No. 679,107 filed on Apr. 21, 1976, assigned to the Ing. C. Olivetti & C., S.p.A. and herein enclosed as reference.

The Keyboard

Referring again to FIG. 3, the keyboard 2 comprises the usual numeral keys and function keys KC (keyboard clear); + (black bar); − (red bar); GT (blue bar); T; S; X; =; +, these bring the keys 61, 62, 65, 63, 64, 66, 67, 68 and 69, respectively, of the electric contact type, connected to the central unit 75 (FIG. 4) through the medium of the units 80, 81, and 82. In the manual mode, all the keys can be used; in the programmed mode, of the function keys only the keys KC, +, − and GT can be used; the striking of one of the other keys gives rise to an error condition (with lighting of the corresponding lamp 52), which must be removed by the operator by striking the key KC 61 and then repeating from the beginning, in the correct manner, the striking of the numeric field during the entry of which the error condition has occurred. Moreover, in the programmed mode, the entry of a numeric field must always be concluded by the striking of one of the three function keys + or − or GT, the keys 62, 65 and 63, respectively, in a known manner.

The entry of − (red bar) and that of GT (blue bar) are separately stored in a suitable RAM cell ("red bar" and "blue bar") of the reserved memory zone 143 (FIG. 6) and these entries constitute in this way one of the jump conditions for the program, as will be described for the instruction BC1.

In the manual mode, the functions called by the function keys operate in the fashion of complex macroinstructions and are performed by making use exclusively of the operative registers R0, R1, R2, R3, that is the registers 132, 133, 134 and 135, respectively, (each having a capacity of 15 decimal digits plus an algebraic sign), which are located in the RAM 79, and also of the service register S 142 (of equal capacity) which is also located in the RAM 79. On the other hand, the registers RA-RD, 144-147, respectively, preserve in their turn, during manual operation, the partial results relating to programmed operation and all the other data necessary to allow resumption of processing in the programmed mode from the precise point at which the request for change to manual has possibly interrupted the same. The operations on the registers R0-R3 take place with the decimals and with the roundings off fixed by the selectors 56 and 55 (FIG. 3) of the operating console 27, with the usual control of exceeding of capacity. In the event of error, the lamp 51 lights up and the operator must cancel the erroneous entry by striking the key KC 61.

Through the medium of an instruction EXR, which will be described hereinafter, the registers RA, RB, RC, RD, 144, 145, 146 and 147, respectively, can be used in a general way in the programmed mode. The registers R0-R3 and S, on the other hand, assume the following significances in the manual mode:

R0 132: input/output register; R1 133: auxiliary register; R2 134: accumulator register; R3 135: "grand total" register; S 142: service register.

The significance of the function keys in the manual mode is more particularly as follows: Key KC 61: this serves to clear, in the case of erroneous entry, the numeric field previously entered, preventing the introduction thereof into the registers of the machine; it moreover has other specific functions which are made clear elsewhere.

Key + 62: this is the addition key in the manual mode: it sends the numeric field entered in algebraic addition to the accumulator register 134 and prints it with its sign and with the operation symbol (+) at the end; the printing is followed by one line-spacing. In the event of error, or of the capacity being exceeded, an error signal is given and, in the second case, the accumulator register is restored to the initial condition; the printing is not carried out. In this case, the operator restores the initial conditions by striking the key KC 61.

Schematically we have the following (the symbol of the register whose numerical contents are considered is indicated in brackets and the sign "→" indicates the transfer from one register to another or to printing and the like): (S) → R0; (R2) → S; (R2) + (R0) → R2. If exceeding of the capacity (overflow) does not occur in addition (R0) → printing. If overflow occurs in addition (S) → R2. Printing is suppressed and an error signal is given.

Key − 65 is the subtraction key in the manual mode: it sends the numeric field entered in algebraic subtraction to the accumulator register and prints it with its sign and the operation symbol at the end; the printing is followed by one line-spacing. Schematically, operations and errors are handled as described hereinbefore for the key +.

Key GT 63: this is the key for prearranging the grand total in the manual mode. The striking of this key causes the machine to store a condition (in the cell PREDIP of the reserved memory zone 143), so that the key T 64 or S 66 struck immediately afterwards acts on the GRAND TOTAL register R3 135 instead of on the accumulator register R2 134. If this prearranging key is touched by mistake at the end of a numeric introduction, this input data item is destroyed. A plurality of consecutive strikings of the key GT confirm the prearrangement.

The action of the keys "T" and "S" is conditioned by the state of other keys and selectors. More particularly, with the striking of the key "T" 64 without accumulation selected, the contents of the accumulator register are printed and zeroized and the printing is followed by two line-spacings. With the striking of the key "T" with prearrangement of "GT"("T1"), the contents of the "grand total" register 135 are printed and zeroized. The printing is followed by two line-spacings; with the striking of the key "T" 64 with accumulation selected "(T+)", the contents of the accumulator register 134 are accumulated algebraically in the "grand total" register 135; the accumulator register 134 is zeroized. The printing is followed by two line-spacings. Moreover, if an exceeding of capacity occurs during the operation of accumulation, an error signal 52 will be given, the "grand total" register 135 will be restored to its initial condition, while the contents of the accumulator register 134 remain in the initial condition; the printing will be effected suppressing the symbol +.

In this case, the operator will restore the initial conditions by striking the keyboard-clear key 61. (R3) → S; (R2) → R0; (R3) + (R0) → R3; if exceeding of capacity does not occur ($\phi$) → R2; (R0) → printing. If overflow occurs (S) → R3; R0 → printing.

With the striking of the key "S" without prearrangement of "GT" (S), the contents of the accumulator register are printed. The printing is followed by two line-spacings; with the striking of the key "S" with prearrangement of "GT" (S1), the contents of the "grand total" register are printed; the printing is followed by two line-spacings.

The equals key "=" is used in multiplication and division operations.

The key assumes the significance consistent with the multiplication or division function last performed.

The key "X" relates to the multiplication operation, which is carried out through the medium of the key "X" in order to introduce the multiplicand and the key = in order to introduce the multiplier, execute the operation and print the result thereof.

In the event of error, the printing is not effected and the operator will be able to restore the initial conditions by striking the keyboard-clear key.

During the operation, an overflow check is made on the result and on the accumulation of the result if accumulation has been selected. In the event of error, the printing of the result is suppressed and the operator will be able to restore the initial conditions by striking the key KC. Schematically: Numeric entry followed by key X: the multiplicand is introduced and it is printed: the printing is followed by a line-spacing: (S) → R0; (R0) → printing; numeric entry followed by key =: the multiplier is introduced and it is printed, the result is calculated and it is printed.

The printing of the operand is followed by one line-spacing, that of the result by two line-spacings: (R0) → R1; (S) → R0; (R0) → printing; (R0) ⇄ (R1). At this point, the multiplier is in $R_B$ and the multiplicand is in R0; (R0) × (R1) → S with rounding off.

If an overflow has not occurred, (S) → R0; (R0) → printing. If an overflow has occurred, printing is suppressed and an error signal is given.

The key "+" relates to the division operation, which is carried out through the medium of the key + in order to introduce the dividend and of the key = in order to introduce the divisor, execute the operation and print the result.

During the operation, an exceeding-of-capacity check is made on the result and on the accumulation of the result if the accumulation selector has been selected.

In the event of error, the printing of the result is suppressed and the operator will be able to restore the initial conditions by striking the keyboard-clear key 61.

A check is also made that the divisor is $\neq$ 0; in the opposite event, an error signal is given, printing is suppressed and the operator will be able to restore the initial conditions by striking the key KC 61. Schematically: Numeric entry followed by the key "+": the dividend is introduced and it is printed; the printing is followed by a line-spacing. (S) → R0; (R0) → printing; numeric entry followed by the key "=": the divisor is introduced and it is printed, the result is calculated and it is printed.

The printing of the operand is followed by one line-spacing, that of the result by two line-spacings. (R0) → R1; (S) → R0; (R0) → printing; (R0) ⇄ (R1). At this point, the divisor is in R1 and the dividend is in R0. (R0) + (R1) → S; (S) → R0; (R0) → printing.

Printing Unit

Referring to FIG. 2, the printing unit 28 comprises the head 29, of the type described in the U.S. patent application Ser. No. 660,930 filed on February 24, 1976 assigned to the Ing. C. Olivetti & C. S.p.A. herein enclosed as reference. More particularly, the head 29 is carried by a carriage movable with respect to the platen and continuously rotatable through the agency of a selector shaft disposed parallel to the platen. A synchronizing disc 37 synchronous with the head indicates to the processing unit 26 through the medium of a pair of sensors, a step sensor 38 and a phase sensor 38', by a series of pulses the character disposed in front of the platen. An electromagnet 39, under the command of the processing unit 26, produces the arrest of the head 29 by means of a hook and the printing of the selected character. An escapement spring, not shown in the drawings, normally biases the carriage in the direction of the arrow. The head 29 is held at rest by a hook through the agency of a step electromagnet 40 controlled by the unit 26 and which moreover provides for the escapement and tabulating movements.

Through the medium of a sense or direction electromagnet 41 which is also controlled by the unit 26, a return-to-the-beginning shaft produces the shifting back of the head 29. The position of the head is detected in turn by a synchronizing disc 42 through the medium of a step sensor 43 by means of a corresponding series of pulses. A microswitch 44 supplies the zero position of the head 29 to the unit 26 when the head is in the starting position in front of the split platen 30.

The line-spacing of the day-book sheet 4 and of the roll 5 is effected through the medium of an electromagnetically controlled clutch 45 controlled by the processing unit 26 and checked by a line-spacing sensor 46 and by a disc 46'. A clutch 47 controlled by the position of the head 29, in a known manner, in split operation, connects the line-spacing shaft to the platen 31 or to the platen 30, in dependence upon the position of the head in front of the platens themselves. The clutch 47 may moreover be normally closed or engaged for joint line-spacing of the two platens. Finally, an electromagnetic clutch 48 which is also controlled by the unit 26 enables a motor 49 to be connected to the selector, return-to-the-beginning and line-spacing shafts.

The Program

This is composed of a sequence of instructions which is adapted to effect the desired processing and in which each instruction represents a command adapted to effect an elementary function. The instructions are formed by one byte of eight bits (single instructions) or by two consecutive bytes ("double" instructions).

The program of the machine embodying the invention is recorded on the carrier 33 (FIG. 1) which is caused to be read by the program reader 32 so as to load it into the "program memory" zone 80 (FIG. 6) of the RAMs 152, 155 which is reserved therefor. In the basic configuration of the machine, this zone is page 1 of the RAM 152, with the exclusion of the data preserving registers, of which there are normally four (RA, RB, RC, RD) and of which, exceptionally, there may be eight (in the case in which RE, RF, RG, RH are also defined); in all, for the program memory 80 there are normally left $256 - 4 \times 16 = 256 - 64 = 192$ words, that is $192:2 = 96$ bytes. In the event of RE-RH being also defined, there remains for the program memory, on the other hand, a capacity of $(256 - 8 \times 16):2 = 64$ bytes. In an extended configuration of the machine, there is added another RAM page 155, the page 2, which also has a capacity of 256 words, that is 128 bytes, and in this case the capacity of the program memory 80 rises to $96 + 128 = 224$ bytes, close to the capacity compatible with instructions constructed with not more than two consecutive bytes.

Figure 8:
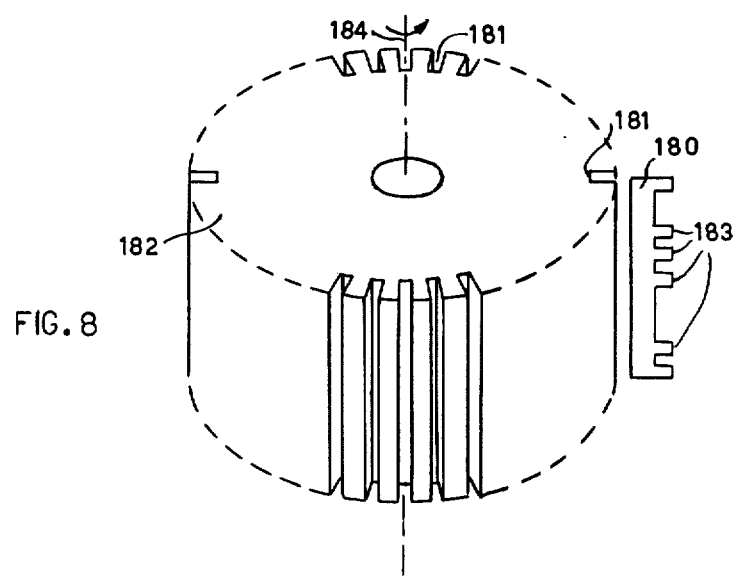
FIG. 8 shows a program drum of the machine of FIG. 1.

In the embodiment described here, the program carrier 33 is of the type described in said U.S. Ser. No. 679,107 and is constituted substantially by 96 lamellae 180 (FIG. 8) provided with eight removable teeth 183; in order to determine the code corresponding to a byte of the program, the presence of a tooth represents the bits of value "1" and the absence of a tooth represents the bit of value "0"; these lamellae 180 are housed in turn in suitable slots 181 formed along the generatrices of a program carrying drum 182 which is capable of carrying a 96-byte program, this being in relation to the capacity of 96 bytes provided in the basic configuration for the program memory, which therefore cannot contain more than one drum.

Of the 96 available positions, three are reserved for service bytes, which are not introduced into the program memory, and therefore there are 93 positions available for the bytes of the instructions true and proper of the program to be introduced into the program memory 80; to be precise, the first two positions are always reserved for signalling the beginning of the drum, also called the "start," constituted by two consecutive bytes 11111111, and the third is always reserved for a byte which defines the address of the program memory 80 from which it is desired that the program itself be loaded. This characteristic of permitting the loading of the program from a programmable position of the program memory enables, for example, the number of preserving registers to be increased from four to eight, or programs contained on more than one drum to be introduced consecutively in the case of a machine with an extended memory, as will be described hereinafter.

The loading of the program into the program memory 80 (FIG. 6) takes place through the medium of the reader 32 which, as described in said U.S. Ser. No. 679,107 is capable of reading the individual bytes thereof sequentially. In the example considered here, the reader causes the drum 182 to rotate step by step; for each of the said lamellae 180 it senses the presence or absence of the aforesaid teeth 183, interpreting them as "1" or "0" bits, respectively. The signals are then transmitted to the unit 26 over eight lines 186 and a line 187 for synchronizing the steps of advance of the drum. During the stage of reading the program and loading it into memory, it is not permissible to operate on the keyboard of the machine; in the event of any such attempt, the data entered is not stored.

By pressing the appropriate push button 19, the drum 182 is caused to rotate for a complete revolution about its own axis 184 and the loading of the program into the RAM takes place from the beginning-of-program address defined by the byte located in the third position of the drum and continues until the entire drum has been loaded; in the case in which the program does not occupy all the positions of the drum, the empty positions are interpreted as instructions NOP, "do not operate."

In the case of an extended configuration of the machine, with a program memory having a capacity of 224 bytes, it is possible to load into the RAM a program contained on a plurality of drums: the first drum is loaded after the switching-on of the machine at the request of the microprogram (made by lighting up the symbol "d" on the display 53); the others can be loaded thereafter, at the request of the program, carried out by suitably programming a load-program instruction LDP without the memory registers being zeroized. That is, the use of the load-program instruction LDP enables more than one program drum to be loaded consecutively into the program memory: for this it is sufficient for the first operative instruction of the preceding drum to be an instruction LDP which requests the loading of the following drum; in this case, the following rules are observed.

In the case of a program contained on one drum only, after the first two beginning-of-program bytes 11111111, the third byte, the beginning-of-program address byte, is 00000000 (or 00100000 $\triangleq$ 32, in the event of the registers RE-RH of the RAM page 1 being defined and employed), and the remaining bytes are bytes of instructions of the program (the maximum number being 93).

In the case of a program contained on two drums, the first two bytes of the two drums have the beginning-of-program codes 11111111. For the first drum, the third byte, the beginning-of-program address byte of the first drum, is 00000000 (or 00100000 $\triangleq$ 32 in the case in which the register RE-RH are also defined), and the fourth byte is the instruction LDP: 00011101, which will request the loading of a second drum. In fact, as soon as the execution of the program of the first drum begins, the first instruction recognized is this instruction LDP which, before the execution itself is continued, requests first of all the loading of the second drum. The 5th–96th positions represent bytes of the program (the maximum number is 92; the last position of the drum may also contain the first byte of a two-byte instruction).

For the second drum, the third byte is the address 01011101 = 93 (or 93 + 32 in the event of the registers RE-RH being defined); the 4th–96th positions represent bytes of the program (the maximum number is 93). Finally, in the case of a program contained on three drums:

1st Drum

1st and 2nd positions: 11111111

3rd position: 00000000 (or 00100000 if the registers RE-RH are used).

4th position: LDP, which will request the loading of a second drum.

5th position: LDP, which will request the loading of a third drum.

6th–96th positions: bytes of the program (the maximum number is 91).

2nd Drum

1st and 2nd positions: 11111111

3rd position: 01011101 ≙ 93 (or 01111101 ≙ 125 = 93 + 32 if RE-RH are defined).

4th–96th positions: bytes of the program (the maximum number is 93).

3rd Drum

1st and 2nd positions: 11111111

3rd position: 10111010 ≙ 186 (or 186 + 32 if RE-RH are used).

4th–43rd positions: remaining bytes of the program (the maximum number is 40).

44th–96th positions: not usable (instruction NOP, "do not operate").

Figure 10:
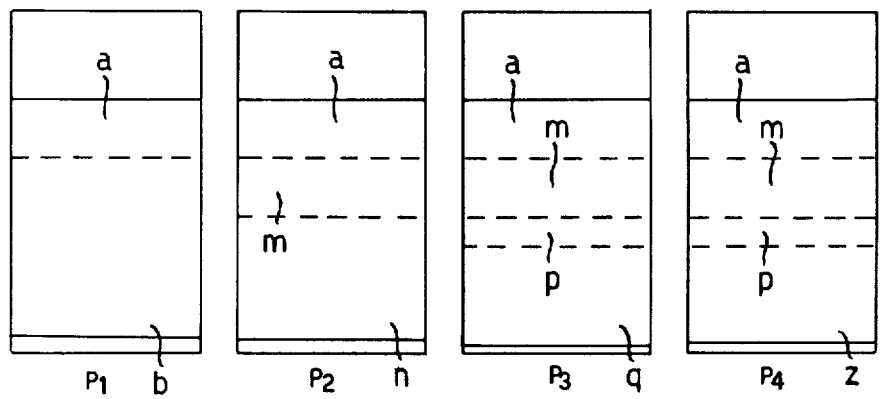
FIGS. 9 and 10 illustrate examples of loading of programs into the RAM of FIG. 6.
Figure 9:
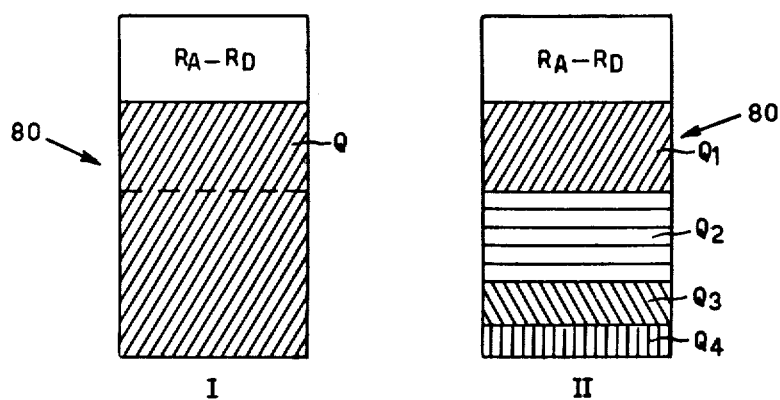

The use of the instruction LDP moreover allows an interesting working procedure, which is exemplified in FIGS. 9 and 10.

In the illustrative case of FIG. 9, the machine has operated on the RAM zone 80 for a certain time with the routine Q loaded from a first drum T1. Thereafter, without the contents of the registers R0-R6 and RA-RD being altered, the drums T2, T3, T4 containing the routines Q2, Q3, Q4 (FIG. 9 II) may be loaded and from this moment on the machine will operate with a program formed from Q1 + Q2 + Q3 + Q4, where Q1 is a part of Q.

In general, the machine can also handle programs in which the length exceeds the capacity of the available memory zone and the program itself is divisible into a plurality of parts to two or more of which a given initial sequence of instructions is common; the repetition of the recording of the said initial sequence of instructions on the physical carrier of the program for each of the parts of the program to which this sequence is common can thus be avoided; this is by virtue of the use of the beginning-of-program address instruction (IP). In the foregoing example, described in FIG. 9 II, the sequence of instructions Q1 is recorded on the physical carrier once only (as initial part of the drum Q), while in the working out of the program it is used twice.

In the example of FIG. 10, a program $p$ of 372 instructions has been assumed, divisible into the parts $p1$, $p2$, $p3$, $p4$ each with a length less than or equal to the capacity of the available memory zone (in the example, 91, 92, 95, 94 instructions); each part comprises sequences of instructions $a$, $b$, $m$, $n$, $p$, $q$, $z$, containing respectively 21, 75, 22, 53, 12, 41 and 39 instructions in accordance with the following scheme of composition: $p1 = a + b$; $p2 = a + m + n$; $p3 = a + m + p + q$; $p4 = a + m + p + z$. In this case it is expedient to prepare drums T1, T2, T3, T4 respectively containing the sequences of instructions: Q1 = $a + b$, comprising 91 instructions; Q2 = $m + n$, comprising 71 instructions; Q3 = $p + q$, comprising 52 instructions; Q4 = $z$, comprising 39 instructions, and having beginning-of-program addresses respectively equal to 0, 21, 43, 55.

First of all, the drum T1 is loaded into the RAM and the machine operates with the program $p1 = a + b$; then the drum T2 is loaded and the machine operates with the program $p2 = a + m + n$; then the drum T3 is loaded and the machine operates with the program $p3 = a + m + p + q$; finally, the drum T4 is loaded and the machine operates with the program $p4 = a + m + p + z$; in this case, the sequences $a$, $m$, $p$ each recorded once only on the physical carrier of the program are used four times, three times and twice, respectively, so that while the program comprises inclusively 372 instructions, only 253 are recorded on the physical carrier; this is particularly useful in the case in which the physical carrier of the program is that of the embodiment described. Bearing also in mind the use of the conditional jump instructions, other more complex working procedures are available, all of them based on the characteristic of the machine of accepting the loading of successive consecutive programs into memory without either the contents of the working registers or those of the preserving registers being altered, on the loading of a following program, with respect to the contents which have been left therein at the end of the processing of the preceding program.

During the stage of loading of the program it is not permitted to carry out any other operation on the machine; the machine is moreover protected from wrong loadings which might be commanded during a prohibited stage; the information on the respective channel is disregarded.

The operator is guided to the loading through the medium of a suitable signal on the operator guiding display 53 (lighting-up of the symbol "d") and is warned not to operate on the keyboard by means of the lighting-up of the error lamp 52, which is then extinguished when loading has taken place and the machine is ready to operate.

The Allotted Instructions

The set of instructions allotted to the accounting machine comprises instructions with a length of one or two bytes (two or four memory words). For example, those instructions which must address program jumps, tabulation positions, those which operate on so-called "immediate" values, that is those which contain numeric information which must be introduced directly by program, have a length of two bytes (four words); on the other hand, for example, addition, subtraction and input-from-keyboard instructions have a length of one byte (two words).

The first word of the first byte contains the operative code and the indication of the length of the instruction (the most significant bit has a value of 0 or 1 according to whether the instruction has a length of one or two bytes, respectively). The instructions which operate on the memory address explicitly one operand only: one register; except for the instruction "EXR," which addresses two operands.

It is possible to address a register indirectly: in this case, the address n of the register Rn on which the instruction is to operate is defined by the contents n of the indirectness register (R7) explicitly addressed by the instruction; this register, also called the index register, is situated in the cell INDEX of the reserved memory zone (ZRM) 143 (FIG. 7). In general, the third and fourth words (the first and second words, respectively, of the second byte) contain a program jump address, a tabulation address or a parameter value.

The instructions used in the embodiment described are illustrated hereinafter.

Of each of these there are also indicated the mnemonic symbol (example, AR) and the binary code of the relative byte or bytes, just as it is defined by the lamellae 180 (FIG. 8), wherein a small generic letter is written in the positions of the indeterminate or variable bits.

Add Accumulator to Register (AR)

Figure 6:
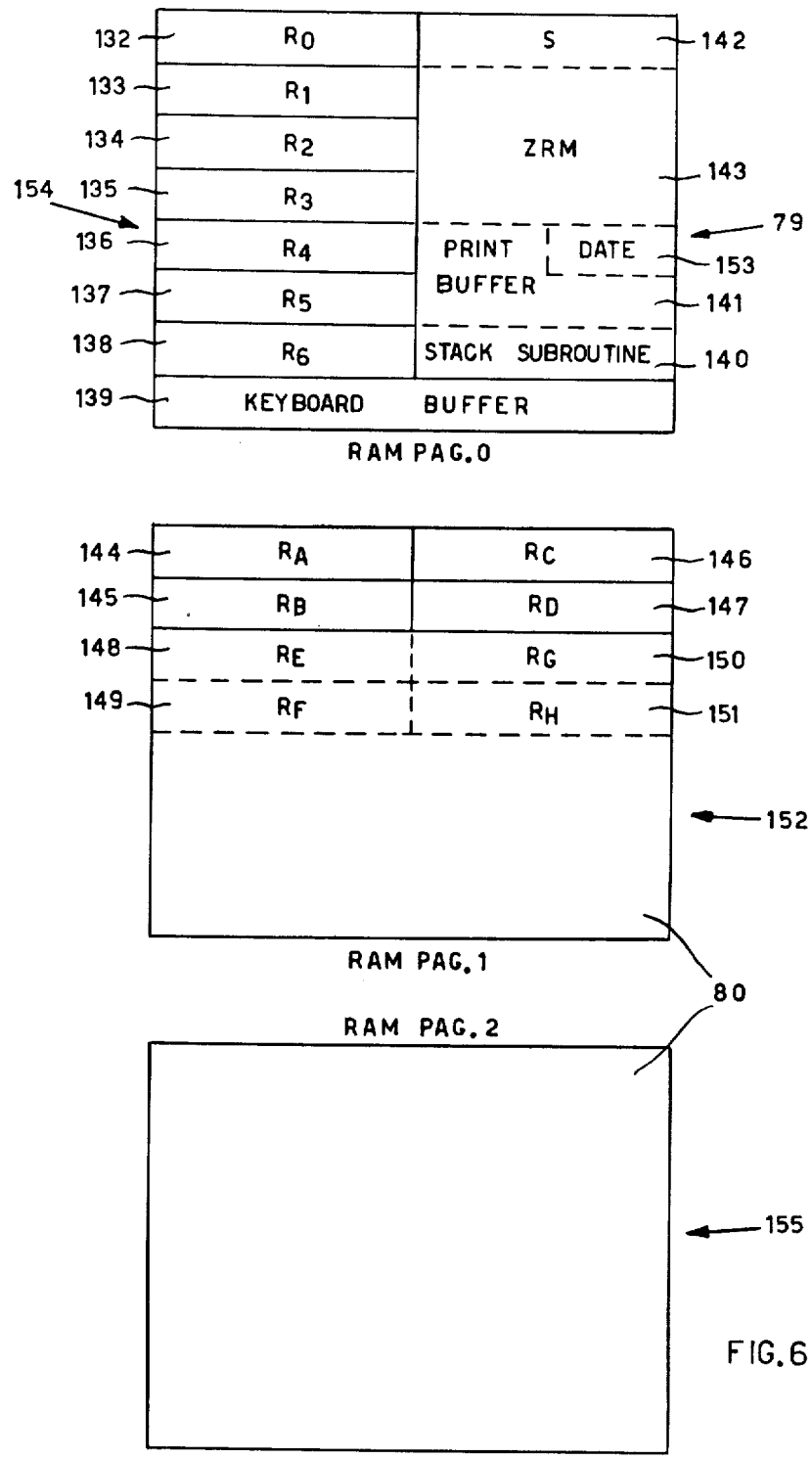
FIG. 6 is a diagram of the arrangement of a read-write memory (RAM) of FIG. 4.

00100rrr. The binary number rrr may assume the values 000–111, to which there corresponds the addressing respectively of the registers R0–R7 (132–138) (FIG. 6). The decimal number contained in the register (accumulator) R0 132 (FIG. 6) is added algebraically to the contents of the register "R" addressed by rrr. The result is formed in the register "R" and R0 remains unchanged. In the case of the capacity being exceeded (overflow), the respective condition is put to 1, that is the overflow bit of the cell SERKEY in the reserved memory zone (ZRM) 143 (FIG. 7), while the register "R" is left unchanged.

Subtract Accumulator from Register (SR)

00101rrr. The decimal number contained in the register (accumulator) R0 132 is subtracted algebraically from the contents of the register "R" addressed by the bits rrr of the instruction in the manner stated in connection with the instruction AR.

The result is formed in the register "R" and R0 remains unchanged. In the case of overflow, the respective condition is put to 1 and the register "R" remains unchanged.

Transfer from Register to Accumulator (RR): 00110rrr. The number contained in the register "R," addressed by rrr in the manner stated, is transferred to the register (accumulator) R0 132 together with its sign.

Transfer from Register to Accumulator with Zeroizing of Register (RRC): 00111rrr.

The decimal number contained in the register "R" addressed by rrr is transferred to the register R0 132 together with its sign. The contents of the register "R" are zeroized.

Multiply (MP): 1000rrr aaaa0sss.

In the manner stated, the binary number rrr addresses the register "R" on which the instruction operates. In the automatic mode, the number in the register is always regarded as whole and the handling of the point is the task of the programmer; with regard to the problem of rounding off, instead of "decimals to be discarded," account is taken of "digits to be shifted to the right." The binary number aaaa can assume only one of the following four binary values:

0000 for rounding off because of deficiency (to "0") of the result;

0101 for mathematical rounding off (to "5") of the result;

1011 for rounding off because of excess (to "9") of the result;

1101 for rounding off to the unit; adds to the digits to be shifted a number constituted by as many "9s" as there are digits themselves, duly propagating the possible carry. If there are no shifts, there is no rounding off. The number sss may assume the values from 000 to 111, to which there correspond respectively shifts to the right (truncations) of the result by from 0 to 7 digits. The decimal number (multiplicand) contained in the register R0 132 (accumulator) is multiplied algebraically by the decimal number (multiplier) contained in the register "R." The result is rounded off in accordance with what is programmed by aaaa and truncated by as many digits on the right as are programmed by sss. At the end of the operation, R0 contains the result. In the case of overflow, the respective condition is put to 1 and R0 remains unchanged. If rounding off is programmed without programming shifting, the rounding off is not carried out.

Divide (DIV): 10001rrr 00000sss.

By means of the binary number sss there is programmed the number of decimal digits (from 0 to 7) of the quotient at which division is to be arrested. The decimal number (dividend) contained in the register R0 132 (accumulator) is divided algebraically by the decimal number (divisor) contained in the register "R" addressed by rrr. The result (quotient) is formed in the register R0 132 (accumulator). Division by "0" is not allowed and is signalled as an error. In the case of overflow, the respective condition is put to 1 and R0 remains unchanged. The division R0:R0 is not allowed.

Add Parameter(ARI): 10010rrr ddddunun.

The number dddd and the number uuuu may assume the binary values 0000 . . . 1001 corresponding to the decimal values 1, . . . 9. The decimal number of two digits, of which the tens digit is defined by dddd and the units digit by uuuu, respectively, is the parameter and is added algebraically to the least significant digits of the number contained in the register "R" addressed by rrr. The result is formed in "R". In the case of overflow, the respective condition is put to 1, while R remains unchanged.

Zeroize (LZ): 01001rrr.

The contents of the register "R" addressed by rrr are zeroized. The sign of the contents of the register "R" zeroized is positive.

Transfer from Accumulator to Register (LR): 01000rrr.

The decimal number contained in the register R0 132 (accumulator) is transferred to the register "R" addressed by rrr together with its sign, leaving the contents of the register R0 (accumulator) unchanged.

Add to Accumulator (AA): 01010rrr.

The decimal number contained in the register R0 132 (accumulator) is added algebraically to the contents of the register "R" addressed by rrr. The result is formed in the register R0 132, while R remains unchanged. In the case of overflow, the respective condition is put to 1, while R0 132 remains unchanged.

Subtract in Accumulator (SA): 01011rrr.

The decimal number contained in the register "R" addressed by rrr is subtracted algebraically from the contents of the register R0 132 (accumulator). The result is formed in R0, while R remains unchanged. In the case of overflow, the respective condition is put to 1, while R0 remains unchanged.

Jump Unconditionally (B): 10100000 iiiiiiii.

The binary number iiiiiii, which may assume the values 00000000–11100000, to which there correspond the addresses 0–224 of the program memory, defines the destination of the jump (the program jumps unconditionally to execute the instruction the first byte of which is located at the address I of the program memory which is defined by iiiiiiii).

In the case in which I is greater than 224, the machine goes out of service.

Jump on Condition One (BC1): 10100ccc iiiiiiii.

This is a group of double conditional-jump instructions which provides for seven different jump conditions.

The second byte iiiiiiii defines the destination I of the jump. By means of the binary code ccc there are programmed the various jump conditions, which are summarized in the following Table (in which A indicates the contents of the accumulator register R0 132 of FIG. 6):

BEQ (A = 0) ccc = 001 contents of the accumulator = 0
BNE (A ≠ 0) ccc = 100 contents of the accumulator ≠ 0
BGT (A > 0) ccc = 011 contents of the accumulator > 0
BLT (A < 0) ccc = 010 contents of the accumulator < 0
BRB (RB) ccc = 101 condition of "Red Bar" activated
BBB (BB) ccc = 110 condition of "Blue Bar" activated
BPR (P2) ccc = 111 the second program has been selected.

If the jump condition is not verified, the program disregards the jump instruction and goes on to execute the following instruction. In the event of the address "I" being greater than 224, the machine would go out of service.

Jump on Condition Two (BC2): 10101ccc iiiiiiii.

This is also a group of instructions (double conditional-jump instructions). The number iiiiiiii defines the destination address (in the program memory) of the jump. The code ccc determines the jump conditions, which are summarized in the following Table:

| Mnemonic Symbol | Code | Jump condition |
|---|---|---|
| BOV OVFW | (ccc= 000) | an overflow condition has occurred during a multiplication, an addition, etc. |
| UNCCND. CALL | (ccc= 001) | jump to subroutine with storage of the reentry address (the address following the address of the CALL instruction). |

In the event of the address I being > 224, the machine goes out of service. At program level there is provided one instruction subroutine call level only, so that it is not possible to call a subroutine within a subroutine.

Return from Subroutine (RET): 01111111.

The program continues from the instruction located at the address following that at which the address byte of the CALL instruction was located. If no CALL instruction has been executed first, the instruction RET produces a jump to the address 0 (the stored reentry address being 0).

Tabulate and Print (P): 101100dd pppppppp.

The binary number pppppppp is the tabulation address and may assume the values 00000001–01111000, to which there correspond the tabulation positions numbered from 1 to 120 from left to right, there being understood by "tabulation position" the relative position of the print head 29 with respect to the paper feed cylinder or platen 30 (FIG. 2). The tabulation address defines the printing position of the least significant character of the numeric field to be printed.

The binary number dd defines the number (0–3) of decimal digits to be printed.

Since the printing takes place proceeding from left to right, the length of the numeric field to be printed (comprising the symbols and the possible check digits) being known to the programmer, the print head 29 is brought into correspondence with the printing position of the first character to be printed (the most significant), after which the contents of the printing register R0 132 (comprising the symbols and the possible check digits) are sent for printing after having been extracted from the printing buffer. The printing takes place without any editing except for the decimal separator; in front of the field is printed the algebraic sign, only if negative, while the positive algebraic sign is not printed. If the current instruction is immediately preceded by an instruction for prearranging the check digit (CKDU, CKDF, see description of relative instructions), the check digit (or digits) will be generated as a function of the field being printed. In the case of fixed check digits (CKDF), the check digits will be printed at the end of the field and separated from its least significant digit by a space; in the case of universal check digits (CKDU), the check digit or digits will be printed at the end of the field without any separation. The printing of the zeroized register with decimals determines the printing of "0.0 . . ." (that is, a zero followed by the point and by as many zeros as there are programmed decimals). The printing of the zeroized register without decimals determines the printing of "0" (one zero only).

Guide Operator One (GUO1): 00010yyy.

Figure 3:
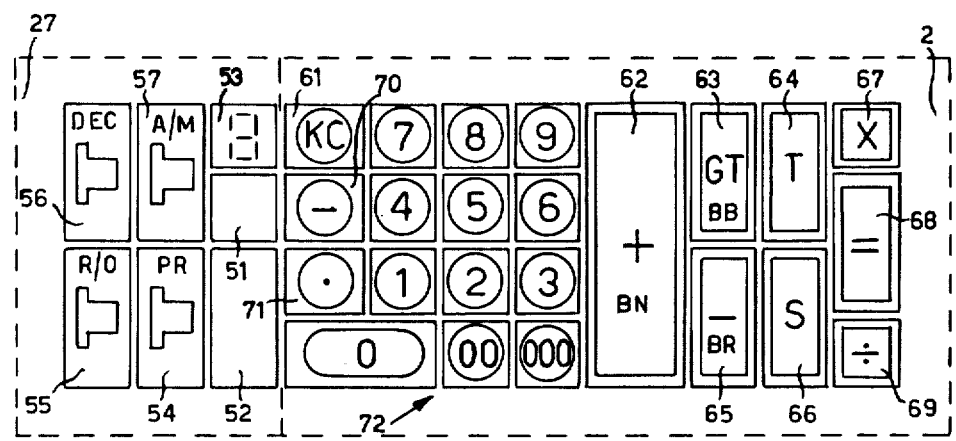
FIG. 3 is a diagram of the keyboard and the operating console of the machine of FIG. 1.

The group of three bits yyy may assume all the binary values from 000 to 111, to which there correspond respectively the decimal configurations 0 to 7 on the numeric display 53 (FIG. 3). The display 53 lights up with the numeric character encoded by yyy. This character remains lit up throughout the execution of the first input instruction which follows the instruction GUO1.

Guide Operator Two (GUO2): 00011yyy.

The group of three bits yyy may assume all the binary values from 000 to 111 with the exception of 101 (see the "LOAD PROGRAM" instruction), to which values there correspond respectively the decimal configurations 8, 9 and the symbols A (yyy = 010), b (011), C (100), E (110), F (111). The display 53 lights up with the numeric character or the symbol encoded by *yyy*. This configuration persists throughout the execution of the first instruction of introduction KN from the keyboard that follows, as will be described hereinafter. The instruction KN following this one will cause the display to light up in accordance with the following table:

| GUIDE OPERATOR | 1st KN | 2nd KN |
|---|---|---|
| 8 | 8 | 9 |
| 9 | 9 | 1 |
| A | A | 1 |
| b | b | 1 |
| C | C | 1 |
| E | E | 1 |
| F | F | 1 |

Load Program (LDP): 00011101.

The machine is put into a condition of waiting for loading of the program drum from which it will emerge when the drum has been loaded. The symbol "*d*" will appear on the operator guiding display 53 and the error lamp 52 will be lit up to indicate that any entry from the keyboard will be disregarded. At the end of the loading both the display 53 and the error lamp 52 will be extinguished. The contents of all the registers R0–R6 132–138 and RA–RB 144–147 are not changed.

Introduction from Keyboard (KN): 000010*dd*

The binary number *dd*, which may assume all the values from 00 to 11, defines the number of decimals provided for the data unit that is input (from 0 to 3). It operates by introducing into the register R0 132 (accumulator) the numeric field contained in the keyboard buffer 139 (there being understood by numeric field all or part of the data unit, the part, of course, already entered). On the operator guiding display 53 there appears a number which corresponds in a specific manner (called continuous) to the serial number of the entries from the keyboard required by means of the introduction from keyboard instructions themselves. The display 53 numbers or counts from 1 to 9 and then recycles to 1.

If, during the introduction of the numeric field extracted from the keyboard buffer 139 into the register R0 132, an error occurs (due, for example, to double striking), the error signal 52 is lit up: the operator, after striking the keyboard-clear key 61, which zeroizes the entire keyboard buffer, sees to reintroducing the said numeric field correctly. In the meantime, the display 53 is not incremented.

During the introduction of the numeric field into the register R0 132, a check is moreover made that the number of decimals entered on the keyboard is less than, or equal to, that programmed by the number *dd* just mentioned. If this check gives a negative result, the error signal 52 is lit up: the operator, after striking the keyboard-clear key 61, which zeroizes the entire keyboard buffer, sees to reintroducing the aforesaid numeric field correctly. If fewer decimals than the number programmed by *dd* are entered, zeros are added at the end of the numeric field itself in a number equal to the decimals omitted. All the numeric entries must be concluded by the striking of a "bar" (black 62, or red 65, or blue 63). The mere striking of a bar, not preceded by a numeric entry, zeroizes the register R0 132 (being equivalent to entering 0000 . . . and then the bar). The sign, if it accompanies the entry, may be entered ahead, at the end or in the middle of the numeric field as many times as desired; if it is not entered, the positive sign will be allotted to the numeric field.

The keys accepted during working in the programmed mode are the numeric keys 72, the key 70 for the sign —, the decimal separator key 71 and the bar keys (black 62, red 65, blue 63). The striking of any other key will give rise, in correspondence with the corresponding instruction "KN," to an error signal. The striking of the decimal separator key 71 (comma, decimal point) may not be preceded by a numeric entry (example: , 341 or 0.341). The striking of the sign key 70 may not be followed by a numeric entry.

If the instruction KN is immediately preceded by an instruction for prearranging the check digit, the last one or two digits introduced are considered as check digits and are therefore verified: they will not be sent to the register R0 132; in these cases, moreover, the maximum length of the number (integer + decimals) is 14 and 13 digits, respectively. If the check gives a negative result, the error signal 52 is lit up: the operator, after striking the keyboard-clear key 61, sees to reintroducing the previously wrong numeric field correctly.

The striking of the minus sign key 70 only or that of the zero key accompanies by the minus sign is stored as a positive zero. The striking of more than 15 digits or, in the case of check digits, more than 13 or 14, gives rise to an error. When the bar which concludes the introduction of the data unit is struck, this bar is stored in the following manner:

(1) the blue bar 63 sets to logical "1" the blue bar bit in the Blue Bar cell of the ZRM 143, leaving unchanged the condition of the red bar bit of the Red Bar cell of the ZRM 143.

(2) the red bar sets to logical "1" the red bar bit, leaving unchanged the condition of the blue bar bit;

(3) the black bar (zeroizes) both the red bar bit and the blue bar bit.

Introduction from Keyboard with Control of Length (KLN): 11000*dd* cc10*nnnn*

The binary number *nnnn*, which may assume all the values from 0001 to 1111, defines the length of the numeric field which is input (with the exclusion of the algebraic sign and the decimal separator). The binary number *cc*, which may assume all the values from 00 to 10, defines one of the following conditions under which the control of length is effected: *cc* = 00 signifies length of the field entered smaller than or equal to *nnnn*, *cc* = 01 signifies length of the field entered equal to *nnnn*, *cc* = 10 signifies length of the field entered greater than or equal to *nnnn*.

The binary number *dd*, which may assume the values from 00 to 11, defines the number of decimals of the numeric field which is input (from 0 to 3).

What has been said as regard the "introduction from keyboard" instruction (KN) is valid for this instruction.

Moreover, the length of the field introduced is verified on the basis of the condition defined by the binary number *cc* (only as regards the numeric characters, including the check in the event of there being one). If this verification gives a negative result, the error signal 52 is lit up: the operator, after striking the key 61 (keyboard-clear), which zeroizes the entire keyboard buffer, sees to reintroducing the previously wrong field correctly. As regards the behaviour of the bars, see what has been said in illustrating the instruction KN. Moreover, the instruction KNL verifies that the decimals entered are exactly equal to the decimals defined by the binary number *dd*. In the range of the length there are also included the possible check digits. If zeros are entered at the beginning, they are significant as regards the control of length, while they will not be printed.

Do Not Operate (NOP): 00000000

No operation is carried out for this instruction: the program goes on to execute the following instruction.

Shift to Right (SHR): 01100*nnn*

The decimal number contained in the register R0 132 is shifted to the right by as many digits as are indicated by the binary number *nnn* (from 1 to 7) and the number itself is truncated by the same number of least significant digits; in the places on the extreme left which are left free there are obviously added as many zeros.

Shift to Left (SHL): 01101*nnn*

The decimal number contained in the register R0 132 is shifted to the left by as many digits as are indicated by the binary number *nnn* (from 1 to 7) and the same number of zeros is added at the end of the number itself. The most significant digits are lost, without any signalling of overflow.

Tabulation and Print Date (PD): 10110100 *pppppppp*

The binary number *pppppppp* is the tabulation address and may assume the binary values from 00001000 to 01111000, to which there correspond the printing positions 8 to 120. The tabulation address corresponds to the printing address of the least significant character of the field to be printed. The length of the field to be printed being known (example: the date 13-12-73), the print head is brought into correspondence with the printing position of the most significant character of the field itself, after which the date register is sent for printing. The day, month and year are always each represented by two digits and separated from one another by the sign "—" (example: 03-02-73).

Horizontal Tabulation (HT): 10110101 *pppppppp*

The tabulation address is programmed by the binary number *pppppppp*, which may assume the values 00000001–01111000, corresponding to the tabulation positions 1–120. The configuration *pppppppp* = 00000000 is prohibited. The print head is brought into the position corresponding to the tabulation address.

Remember Length of Page (PAGE): 10111100 *nnnnnnnn*

The length of the page is the number of lines thereof. The number *nnnnnnnn* may assume the binary values 00000001 to 11111111, to which there correspond various page lengths, from 1 to 255 printing lines. The length of the page is loaded into the register PAGER constituted by the cells PAGE1 and PAGE2 157, 158 of the reserved memory zone 143 and at the same time the register VIR 171, 172 in which the last vertical tabulation address is contained is put = 1.

Vertical Tabulation (VT): 10111101 *pppppppp*

The binary number *pppppppp*, which may assume the binary values 00000001–11111111, defines the tabulation address and by means of it there are programmed the vertical tabulation positions 1–255 (numbered progressively on the page from top to bottom).

The sheet of paper or the roll reach through successive line-spacings the programmed position defined with respect to line No. 1 (top margin) of the page. At the beginning of the work it is therefore necessary to position the sheet exactly so that the printing line corresponds to line 1 of the page.

The programmed vertical tabulation address, which cannot be greater than 255, must never be zero, nor greater than the number of lines contained in the page.

Print Symbol (PI): 10110110 000*sssss*

The binary code *sssss* serves to program one of 20 print characters, in accordance with the following correspondence table:

| | | | |
|---|---|---|---|
| 00000 | 0 | 01010 | — |
| 00001 | 1 | 01011 | . |
| 00010 | 2 | 01100 | , |
| 00011 | 3 | 01101 | = |
| 00100 | 4 | 01110 | * |
| 00101 | 5 | 01111 | S |
| 00110 | 6 | 10000 | T |
| 00111 | 7 | 10001 | X |
| 01000 | 8 | 10010 | + |
| 01001 | 9 | 10011 | : |

The programmed character is printed where the print head is.

Exchange Registers (EXR): 10111110 1*mmm*0*nnn*

The contents of two given registers, including the algebraic sign, are exchanged in order and mutually. The binary numbers *mmm* and *nnn* identify the two registers RM and RN, respectively, involved in the exchange operation.

The value "0" or "1" of *l* indicates, respectively, that the exchange takes place between two registers (RN, RM) both located in RAM page "0" 79, or between one register (RM) located in RAM page 1 152 and one register (RN) located in RAM page "0" 154.

In correspondence with *l* = 0 (RM in memory page 0, 79), the binary number *mmm*, by means of which the register RM is identified, may assume the values 000–110, corresponding respectively to the registers R0 . . . R6; in correspondence with *l* = 1 (RM in memory page 1), it may normally assume the values 000–011 corresponding respectively to the registers RA, RB, RC, RD (144, 145, 146, 147).

With *l* = 1, *mm* may also assume the binary values 100 to 111; in this case, another four registers RE, RF, RG, RH (148, 149, 150, 151) in page 1, 152 will be defined at the expense of the memory of page 1 devoted to the program. In this way, it is possible to introduce constants into the registers RE 148, RF 149, RG 150, RH 151 from a drum. The first two bytes of the register RE 148 must then contain a jump which skips the constants.

The binary number *nnn*, by means of which the register RN is identified, may assume the values 000–110 corresponding respectively to the registers R0 . . . R6 (132–138) defined in RAM page "0" 79, the value 111 indicating the indirectness register R7 (cell INDEX 161 of the reserved memory zone (ZRM) 143).

It should be noted that it is not possible to exchange the contents of two registers both located in RAM page 1, 152. It is possible to perform indirectness only on the registers RN.

Exchange block (EXB): 00001111

The contents of the registers R0 132, R1 133, R2 134, R3 135 of RAM page "0" 79 are exchanged in order with the contents of the registers RA, RB, RC, RD (144–147), respectively, of RAM page 1 (152).

Put absolute in accumulator (ABS): 00001101

The contents of the register R0 132 (accumulator) assume the positive sign.

Change algebraic sign in accumulator (CHS): 00001110

The algebraic sign is inverted in the contents of the register R0 132 (accumulator). If the contents of the register are zero, the instruction CHS does not operate (+ 0 remains).

Load index (LX): 01100000

This transfers the least significant digit of the accumulator register (R0) to the index register (R7) (cell "INDEX" of ZRM).

Read index (RX): 01101000

This transfers the contents of the index register 161 to the least significant digit of R0 132, after zeroizing it.

Force digits expressed in decimal numbers (FDD): 00000ddd

This instruction allows numeric data to be introduced into the program. The binary number *ddd* programs from 1 to 7 bytes consecutive to that of the instruction FDD itself, which are interpreted not indeed as instructions, but as pairs of decimal digits (one byte contains two words or digits). The pairs of decimal characters *aa, bb, cc, . . . gg,* which follow the instruction in order, are put into the register R0 132, with the pairs described last in the two least significant positions. The positive sign is allotted to the number composed in this way in the register R0 132.

Line-space (NL): 00001100

This causes a line-spacing to be executed. If the platen 31 and the split platen 30 are separated and the head 29 is in front of the platen 31, the line-spacing is performed on the platen 31, while it is performed on the split platen 30 if the head is in front thereof. If, on the other hand, the platen 31 and the split platen 30 are rendered fast with each other by the clutch 47, the line-spacing operates only if the head is in front of the platen 31. If the head is in front of the split platen, the instruction NL behaves like an instruction NOP (it does not do anything).

The interpreter

Figures 11A, 11B:
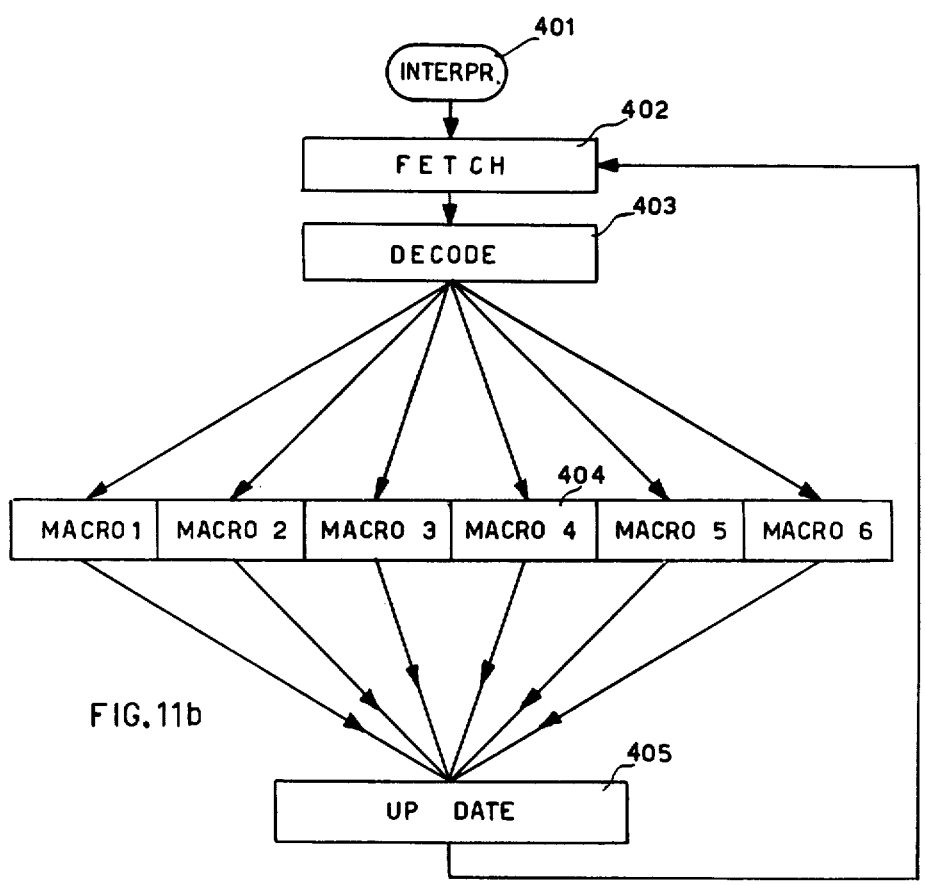
FIG. 11a illustrates the use of the RAM in conjunction with the interpreter of the machine.
FIG. 11b is a diagrammatic representation of the interpreter microprogram.

This is that part of the microprogram which provides for the reading and execution of the instructions (also called "macroinstructions" in this context) of the program (this being also described as the "macroprogram"). The interpreter microprogram comprises various stages which are as follows: extraction of the instruction from the program memory; recognition; elimination of indirectness; execution; updating of the macroprogram counter. These stages are cyclic and after the fifth stage a return is made systematically to the first stage (FIG. 11b). The instructions are constituted by 8-bit bytes and are each located in the RAMs (pages 1 and 2, RAMs 152, 155) in a pair of adjacent cells (one byte equals two digits).

The extraction of the macroinstruction takes place on the basis of the contents of the macroprogram counter MPC constituted by the two consecutive digits PC1 159 and PC2 160 of RAM 143, which enable counting from 0 to 255, that is the maximum number of bytes of the program, which is 224, to be covered. The RAM being organized in 4-bit digits, while the (macro)instructions are 8-bit bytes, that is corresponding to the capacity of two digits, it is clear that the contents of PC1 159 and PC2 160 will be processed before being loaded into the register B 107 addressing the RAMs 79, 152, 155, through the medium of which register the extraction will take place. This processing must take account of the fact that the program memory pages are page 1 RAM 152 and possibly page 2 RAM 155 and that the first 64 digits of page 1 (FIG. 11a) are reserved for the preserving registers RA, RB, RC, RD (144, 145, 146, 147), so that 32 bytes (that is, 64 digits) are not usable.

For recognition, there are $2^8$ possible codes for the macroinstructions and they can be classified in 16 groups identified by the most significant digit of the byte (0–15). The recognition takes place in two stages wherein the group to which the instruction belongs is recognized in one and the individual instruction is recognized in the other. The isolation of the parameters contained in the byte of the instruction is left to the stages of elimination of indirectness and execution.

Since the indirectness makes use of the addressing configuration of the register R7, in all the instructions which refer to the registers, in order to address the index register, RAM cell INDEX 161 of ZRM 143, the elimination of indirectness forms part of the stage of assumption of the parameters of each instruction.

Initialization, Programmed or Manual Operation

After switching on, the processing unit of the machine requires an initialization stage during which the data memory 154, 144–151 and program memory 80 are zeroized and moreover control of the commands is assumed at the interface 81, 82 with the mechanical means 91 in order to put them into a predetermined condition. The initialization stage, which is described in the flow diagram of FIGS. 12a, 12b, 13a, 13b, is handled directly by the microprogram and manifests itself by the shifting of the print head 29 to the zero tabulation position, that is to the extreme left-hand position of the split section 30.

Figure 12A:
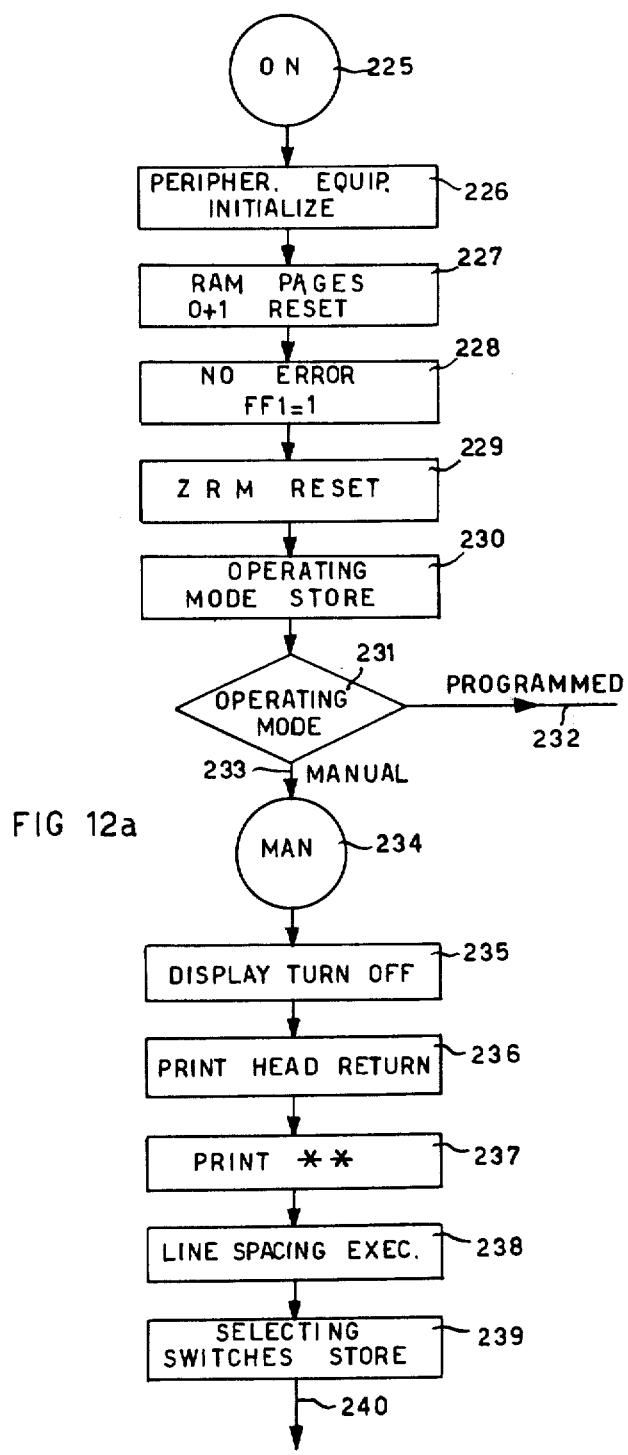
Figure 13A:
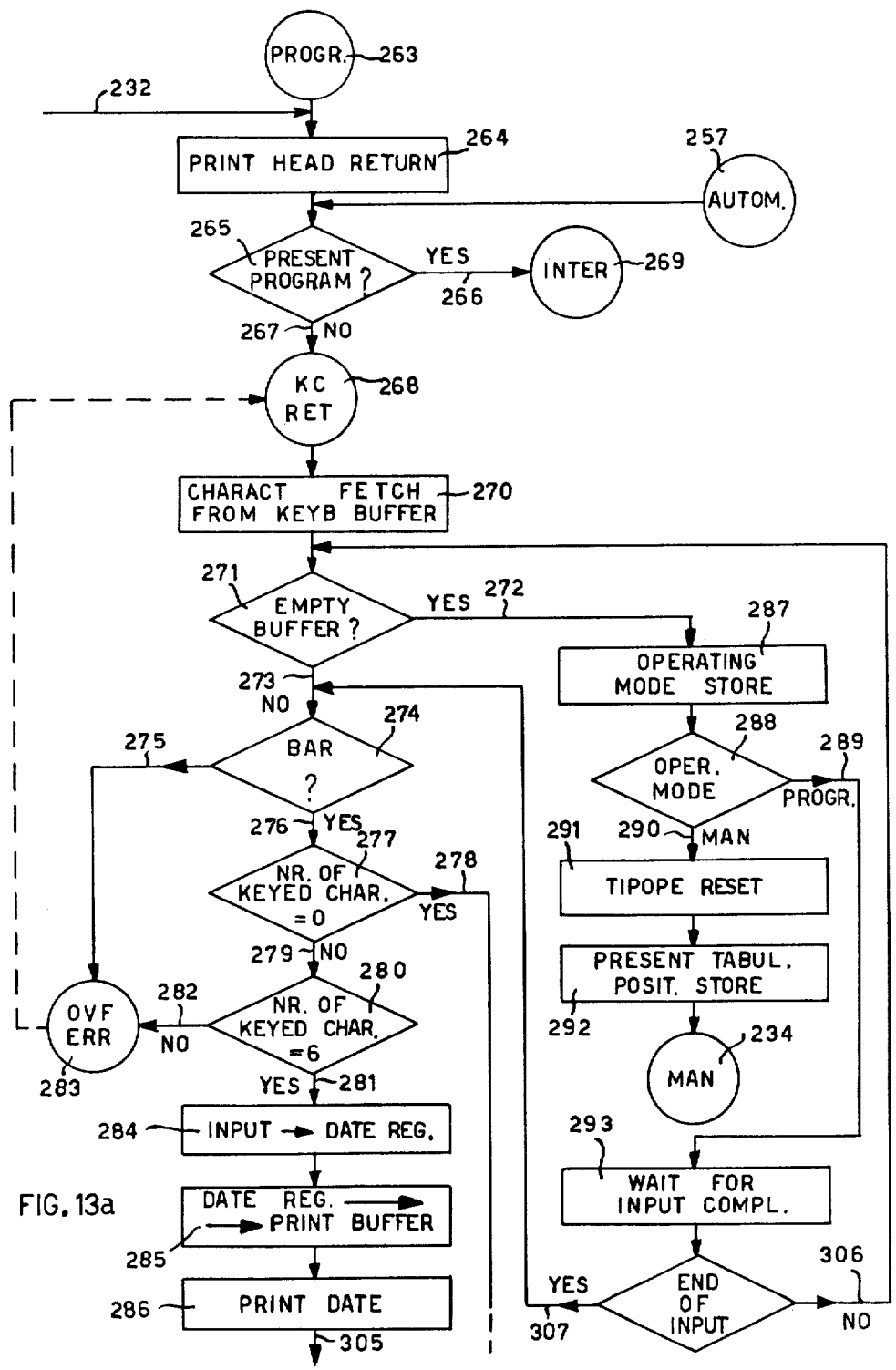
Figure 13B:
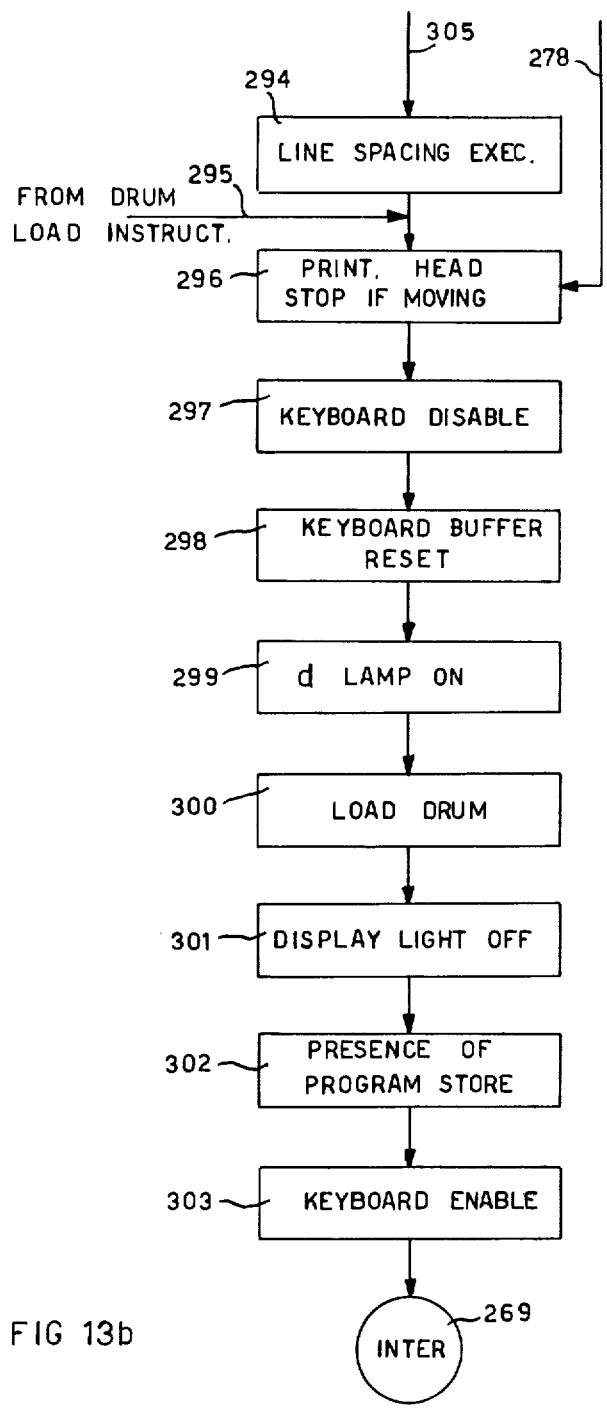

Following the diagram of FIG. 12a, the machine "enters" the mode identified by the selector 57. More particularly, in the manual mode it is necessary to note the "printing of the symbols," which consists in the printing of two asterisks on the roll 5 as soon as the machine enters the manual mode. The "exchange of the registers" (FIG. 12b) is the operation necessary to preserve the contents of the registers R0 . . . R6 (132–138) when the program is interrupted by the change to manual mode. On return to the programmed mode, the print head 29 repositions itself where it was on the change to manual.

In the programmed mode (FIG. 13a), the initial procedure handled by the microprogram is as follows: the machine prearranges itself to accept the possible introduction of the date from the keyboard 2: the number of characters introduced, which may be only six or zero, is checked; in the event of error, on the following striking of a bar (black 62, red 65 or blue 63), an error signal 52 will be given and the operator will restore the initial conditions simply by striking the keyboard-clear key 61.

Then the date, introduced by striking six characters (including the zeros) without separating symbols, will immediately be printed on the roll 5, in correspondence with the split section 30, with the six characters in groups of two separated by the symbol "—." Example: 06-02-75. If it is not desired to introduce the date, it is sufficient to strike a bar 62 or 65 or 63 without having previously entered anything, in which case the microprogram, recognizing the number of the characters entered as equal to zero, does not give an error signal 52.

After the striking of a bar, the symbol "*d*" will be lit up on the alphanumeric display 53 to warn the operator that from that instant the machine is awaiting the loading of the program, and at the same time the error lamp 52 will be lit up to signal that no entry on the keyboard is considered valid in that state of the machine. With the program loaded, the two signals will be extinguished simultaneously and the machine will be ready to operate to program.

In the programmed mode, every time the program requests a data unit from the keyboard buffer 139 in correspondence with an introduction from keyboard instruction KN, the microprogram will verify whether the machine is still in the same state, otherwise the machine will put itself into the manual mode.

A detailed description of the said flow diagram will now be given with reference to the said Figures. On the switching on 225 of the machine (FIG. 12*a*), the initialization stage takes place, which comprises in sequence:

Initialization of peripheral units (operation 226);

zeroizing (operation 227) of pages 0 and 1 of RAMs 79, 152, that is of the data memory 154, 144-151 and the program memory 80 and of the reserved memory zone (ZRM) 143;

storage of the condition of absence of error (operation 228);

initialization of the reserved memory zone 143 (operation 229);

reading and storage of the machine mode (operation 230), determined by the position of the relative console selector 57 (FIG. 3). Here the microprogram reaches the logical decision 231 (FIG. 12*a*) and, according to whether the mode selected by the selector 57 is manual or programmed, the microprogram, following the path 233 or 232, respectively, enters the sequence 234 designated "MAN," relating to manual operation, or the sequence 263 (FIG. 13*a*) designated "PROGR" relating to programmed operation. The sequence 234 "MAN," executed whenever the machine enters the manual mode, whether it arrives thereat from the programmed mode or arrives thereat directly from the switching on, comprises, in succession, the following operations:

turning-off of the operator guiding display 53 (operation 235), return of the print head 29 to the beginning (operation 236), printing (operation 237) of two asterisks in the positions on the extreme left of the roll of paper 5 reserved for printing in the manual mode, carrying-out of one line-spacing (operation 238), reading and storage (operation 239) of the state of the rounding-off selector 55 and the decimals selector 56 (FIG. 3) located on the operating console 27 and also of the "grand total key/blue bar" 63 located on the keyboard 2, then, following the logical connection 240 (FIG. 12*b*), methodical exchange of the contents of the working registers R0-R3 (132-135) with the contents of the preserving registers RA-RD (144-147), in order to preserve the contents of the former in the latter (operation 241).

When, in fact, manual operation has not been selected on the switching on of the machine, but is selected by the operator, in the case of the execution of a program, on the interruption of the program itself for the change to manual operation, the working registers R0-R3 (132-135) which must be rendered free to allow the execution of calculations in the manual mode, contain intermediate data and results relating to the processing of the program itself, which data and results will all have to be retrieved when the operator, having completed the manual calculations, again selects the programmed mode, causing the resumption of the interrupted program. This is followed by zeroizing (operation 242) of the memory No. of the prearrangement of the grand total, "prearr. GT" bit of the cell 162 "PREDIP" of ZRM 143, in which is stored, solely during operation in the manual mode, the prearrangement of the grand total which the operator activates by striking the corresponding key GT/blue bar 63;

extraction and recognition of a character from the keyboard buffer 139 (FIG. 6) (operation 243, FIG. 12*b*).

At the logical decision 244 the state of the keyboard buffer 139 is examined to determine whether it proves to be empty or not. If it does not prove to be empty, the microprogram goes on (logical connection 245) to execute the sequence "Operation Execution" 308, which continues the execution of the arithmetical operation which is possibly in progress. If, on the other hand, the keyboard buffer 139 proves to be empty, the path 246 is followed and the operation 247 is executed, by which there is read from the corresponding console selector the machine mode currently selected, which is then stored in ZRM 143, cell 163 ASSMAC, bit AUTO/-MAN.

The mode currently selected is then examined again (decision 248) and, if it is the manual mode, the microprogram goes on (path 249) to read and store (in ZRM 143, cell 164 DIGT, "grand total" bit) the possible "grand total" condition activated by the operator by striking the key GT 63. It then waits (operation 259) for the completion of the numeric input data and until this is accomplished, by means of striking of one of the function keys by the operator, the microprogram itself enters a loop recycling upstream of the decision 244. When the input data unit is finally completed by the striking of a function key 62-69, at the decision 260 the microprogram takes the path "YES" 262, proceeding to execute the above-mentioned sequence 308. This provides for executing the arithmetical operation previously entered by striking the relative function key.

If, on the other hand, at the logical decision 248 the machine mode proves to be the programmed mode, the microprogram (following the logical path 250) first of all restores (operation 251) the relative position of the print head 29 with respect to the paper feed cylinder or platen 30. More particularly, the head is exactly in the position which it was occupying on the preceding interruption of the program; the microprogram then effects the methodical and complete exchange (operation 252), which is the opposite of that previously described, of the contents of the registers R0-R3 (132-135) with the contents of the registers RA-RD (144-147).

In this way, the data and intermediate processing results relating to programmed operation which were preserved in the registers RA-RD on the change to manual operation are restored to the registers R0-R3. Thereafter, a check is made (decision 253) whether the input from keyboard instruction in correspondence with which the program was interrupted, and in correspondence with which the program resumes, is an instruction KNL or not. In the affirmative case, this being a double instruction (consisting of two bytes), it is necessary to put the counter MPC 159, 160 back by one place (operation 256), for the purpose of taking the first byte thereof into consideration again and allowing correct interpretation of the instruction itself. After this, the sequence AUTOM 257 (FIG. 13a) is entered into, which provides for executing the program after ascertaining the presence thereof in the program memory (decision 265). This ascertainment is prearranged in view of the case in which the program has not yet been initiated, as happens when the machine is switched on in the manual mode. The sequence 269 is the interpreter which, as stated, provides for the recognition and execution of the individual instructions.

In the event of the machine being in the programmed mode on switching on, the decision 231 (FIG. 12a) enables the path 232 (FIG. 13a) which leads to the sequence PROGR 263. This begins by bringing the print head 29 to the beginning (operation 264) and then tests for the presence (decision 265) of the program (stored in ZRM 143): if the program is present, the path 266 leads directly to the interpreter 269; the hypothesis of the program being already present is provided for here in order to be able to utilize this sequence also by proceeding from the entry AUTOM 257, which happens when the programmed mode is arrived at for the first time having switched the machine on in the manual mode (see output 257 in FIG. 12b).

If the program is absent, the machine having just been switched on and no program drum 182 having yet been loaded therein, a sequence begins in which, inter alia, the date is printed. The path 267 leads to the sequence 268 KC-RET (return from keyboard clear), which is normally arrived at in the case of error or overflow (output 283) after the operator has struck the key KC 61. There follows the extraction and recognition of the characters entered and present in the keyboard buffer 139 (operation 270); the state of the buffer 139 itself is then examined (decision 271). If this proves empty (path 272), the current mode is stored (operation 287) as defined by the corresponding selector; then (decision 288), if the mode is manual (path 290) and therefore appears to have been changed after the switching on of the machine, this goes on to zeroize the memory TIPOPE 167 (located in ZRM, FIG. 7), which identifies the operative chains (operation 291), and then to store the present tabulation position of the print head 29 in the cells POSAT1 165, POSAT2 166 of ZRM 143 (operation 292); finally, the sequence MAN 234 already described (FIG. 12a) is entered into for the case in which the machine is already in the manual mode on switching on.

If, on the other hand, it is reconfirmed that the machine is still in the programmed mode (path 289), the machine waits for the input data unit (introduced from the keyboard 2) to be completed by the striking of an "end-of-input" key (that is a "bar" 62, 65, 63). If, after a certain waiting time (operation 293), the end-of-input entry has not yet occurred, a waiting loop for the same (306, 271, 272, 287, 288, 289, 293, 306) is entered and the machine remains therein until the said entry takes place and, of course, as long as the keyboard buffer 139 remains empty and the mode is not changed.

With the empty keyboard buffer and automatic mode conditions persisting, if the "end-of-input" is finally entered, decision 274 is arrived at (path 307) and a check is made whether the "end-of-input" key struck is a "bar": if not (path 275), the error or overflow condition (283) is reached; if so (path 276), a check is first made that the number of characters keyed is not zero (decision 277) and then that it is six (decision 280), after which the data unit introduced is stored in the date register 153 of ZRM (operation 284) and then the contents of the date register 153 are sent (operation 285) to the printing buffer 141, whence the date is finally printed (operation 286). Then (following the path 305, FIGS. 13a and 13b), a line-spacing is executed (operation 294), the print head 29 is stopped (operation 296) if in motion, the keyboard 2 is disabled (operation 297), the keyboard buffer 139 is zeroized (operation 298) and the symbol "d" on the operator guiding display 53 is lit up (operation 299) to request the operator to load the program drum 182 (operation 300). As will be seen hereinafter, after this has happened, the display 53 is turned off (operation 301), the presence of the program in ZRM 143 (FIG. 6) is stored (operation 302), the keyboard 2 is reenabled (operation 303) (FIG. 13b) and then the execution of the instructions of the program is initiated by entering into the sequence 269 constituting the interpreter.

Returning to the decision 277 (FIG. 13a), in the case where the operator has deliberately omitted the date, striking the end-of-input bar only, the number of characters keyed is zero and the microprogram, following the path 278 (FIG. 13b), passes directly to operation 296, that is duly omitting the printing of the date.

Returning to the decision 280 (FIG. 13a), if, after finding the number of characters keyed is not zero, it is found different (282) from the number six provided for the date, then a keying error by the operator is certainly present and an error signal 52 is given (283).

Loading of the Program Drum

Figure 14:
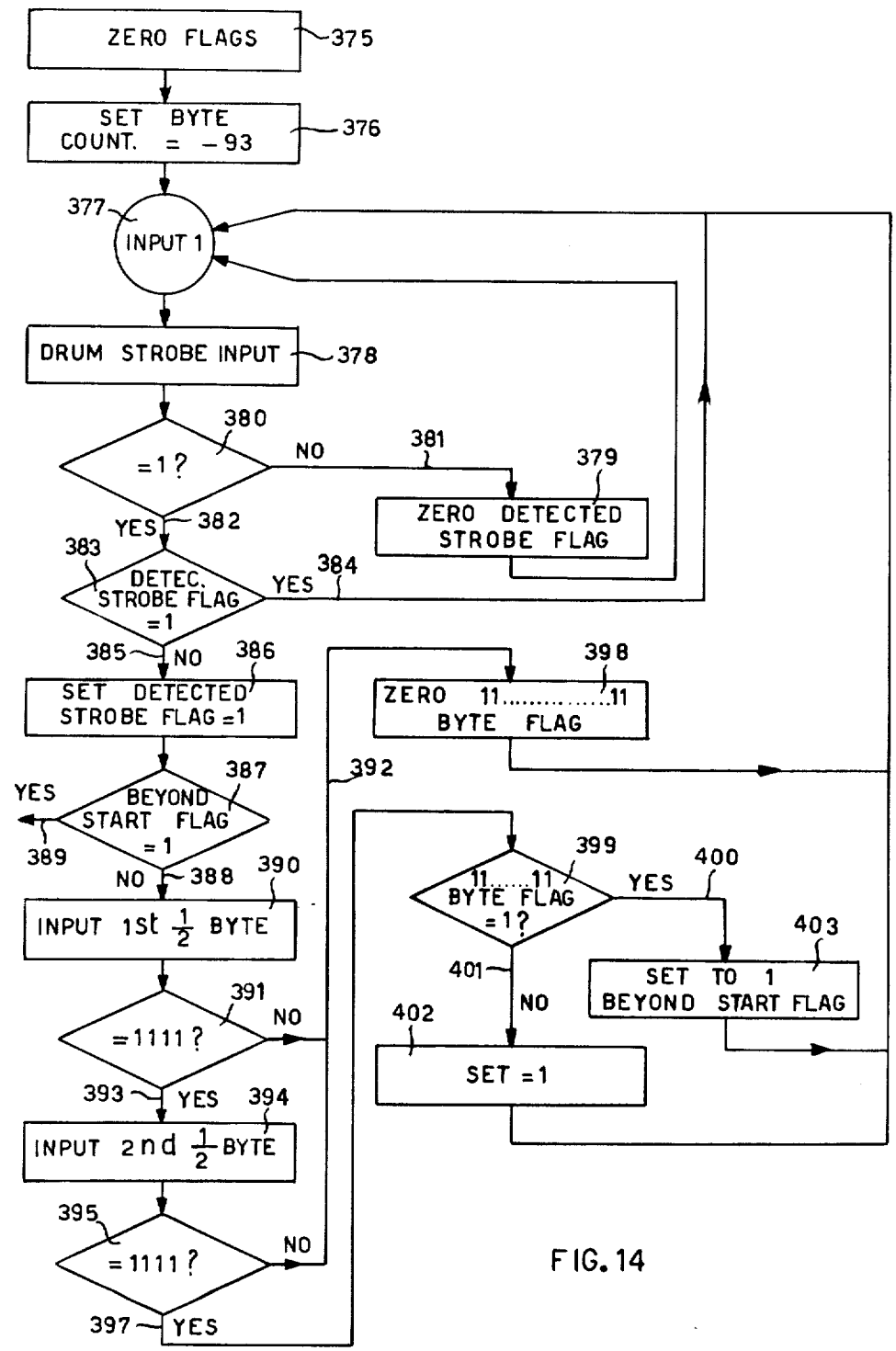
FIGS. 14 and 15 are flow diagrams illustrating the operations of loading the program drum.
Figure 15:
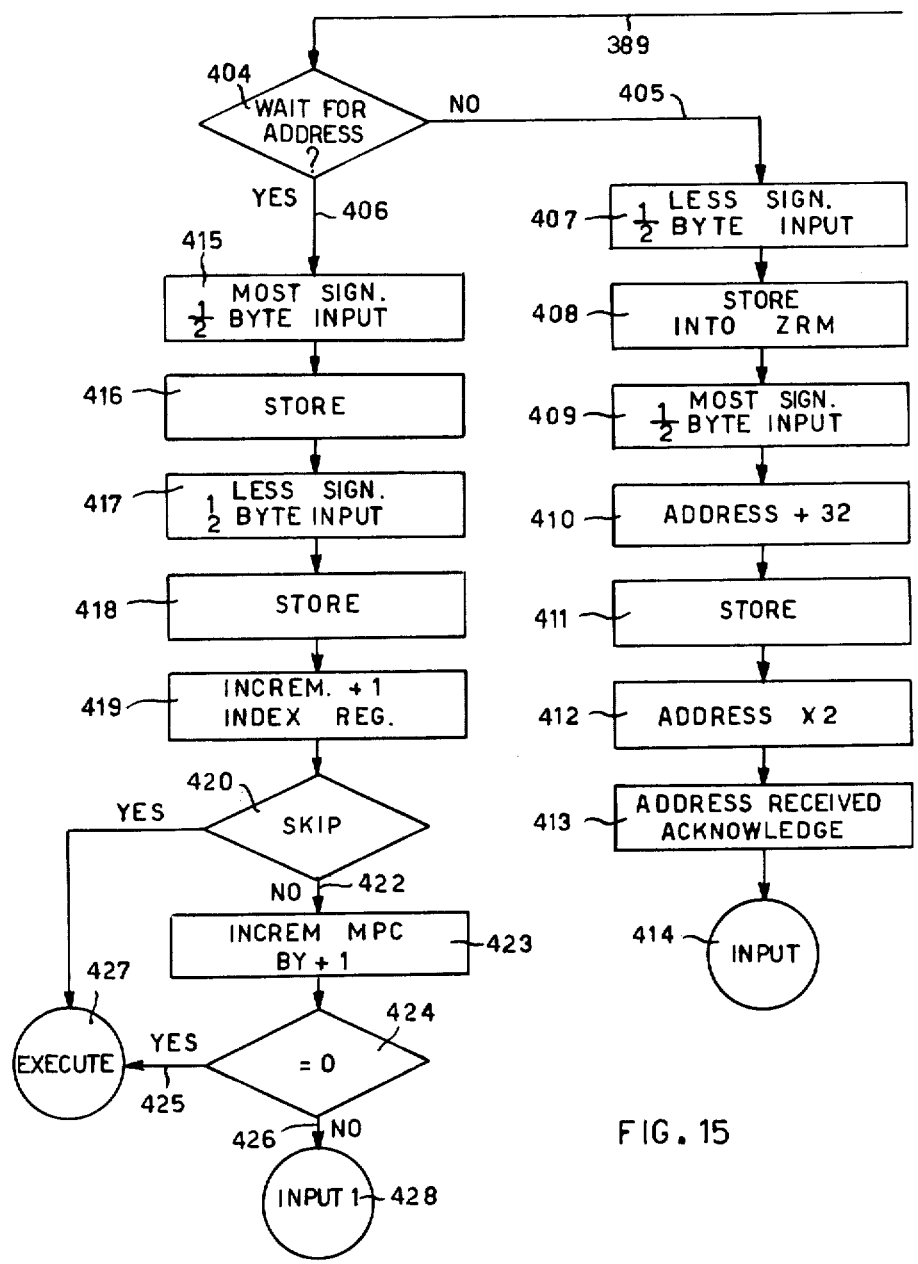

This operation, which is started manually by the operator, is described by the flow diagram of FIGS. 14 and 15. On indication by the display 53 (FIG. 3) supplied by means of the lighting-up of the letter "d," the operator must first of all insert the program drum 182 in the machine and then, through the medium of the key 19 (FIG. 1), start the rotation and the reading of the drum itself. At this point, the microprogram proceeds as indicated in FIG. 14, namely:

it zeroizes (operation 375) all the logical flags concerned, that is a "detected strobe" flag, constituted by the "strobe already detected" bit of the cell 168 of ZRM 143, which responds to the synchronizing signals coming from the line 187 of the reader 32 (FIG. 2), a "byte 1111 1111 already found" flag and a "beyond start" flag, which give the indication of the reading of the beginning-of-program lamellae 183 (FIG. 8), and an "address already found" flag. These flags are memories with a capacity of one bit which are located in the reserved memory zone (ZRM) 143 in the cell SS 168.

sets the counter MPC to the initial value of −93 (operation 376), the counter being employed in this stage as a counter for the bytes of the program drum having the significance of an instruction.

The maximum number of bytes that the program drum 182 can physically contain being 96, with the three initial service bytes taken away the bytes having the significance of an instruction are at the most 93;

it enters into the sequence INPUT 1 377, which tests for the presence of the drum strobe signal coming from the lines 187 (FIG. 2) and recognizes first of all the beginning of the program (start), in the manner hereinafter indicated.

Until the drum strobe signal is present, the microprogram recycles, while waiting for the said signal, following the path: block 378, decision 380, NO exit 381 of this decision, block 379 which zeroizes the detected strobe flag each time, and then return to the beginning of INPUT 1 377. As soon as the drum strobe signal appears (goes to logical 1) and a byte of the drum is therefore read, the exit 382 of the decision 380 opens and the microprogram arrives at the decision 383.

The NO exit 385 remains open as long as the detected strobe flag is at zero, for which reason the said flag is set to 1 (block 386), whereby the path 385 closes. At the logical decision BEYOND START (decision 387), the beyond start flag being at zero the first time, the microprogram proceeds via the NO exit 388 whence the first word (the most significant) of the first byte read is introduced (block 390, INPUT first half-byte) to check whether it is equal to 1111. In the negative case, the NO exit 392 of the decision 391 is opened and along this path the microprogram, after zeroizing the "byte 11111111 already found" flag (block 398), recycles to the beginning of the sequence INPUT 1 377, putting itself in a state of waiting for the following drum strobe signal. In this case, the second word of the byte is not even examined and, instead, the machine goes on to read the following byte and to make the same check thereon, proceeding in this way until the start is found and recognized, so that before the start no byte can be interpreted or executed as a program instruction. In the affirmative case, the exit 393 of the decision element 91 is opened and the second word, the less significant word, of the first byte is introduced (block 394, INPUT second half-byte) in order to check, also for this word, whether it is equal to 1111; in the negative case, the byte cannot be recognized as a byte 11111111 and the NO exit of the decision 395 is opened and, via this exit after the "byte 11111111 already found" flag has been zeroized (block 398), the microprogram recycles to the beginning of the sequence INPUT 1 377, putting itself in a state of waiting for a following drum strobe signal. The byte, the second word of which is not 1111, is not then taken into consideration and the machine goes on to the examination of the following byte, in search of the start.

If the second word of the byte also has the value 1111, the exit 397 of the decision 295 is opened and the logical decision constituted by the decision 399 ("Byte 11111111 already found" flag = 1) is arrived at. Here two cases arise, according to whether a byte 11111111 has already been previously read or not. If no byte has ever yet been read previously and the byte now considered is therefore the first byte 11111111 which is found, the "byte 11111111 already found" flag is still at logical zero and, therefore the NO exit 401 of the decision element 299 is open, so that the flag is set to 1 (block 402) and the microprogram therefore recycles to the beginning of the sequence 377, putting itself in a state of waiting for a second byte 11111111 which completes the start.

If, on the other hand, prior to the byte now read, another byte 11111111 has already been read, the "byte 11111111 already found" flag is already at logical 1 and therefore at the logical decision 399 the YES path 400 is followed, so that the "beyond start" flag is set to 1 (operation 403), to signify that the start has been found; a return is then made to the beginning of the sequence INPUT 1 377, waiting for the first instruction. When this is read, the path 382 (YES) is followed at the logical decision 380, so that the detected strobe flag is set to 1 (operation 386) and then, at the logical decision 387, the beyond start flag being at 1, the path 389 (YES) is followed to FIG. 15. Here two cases again arise, according to whether it is a question of the first byte read after the start or of any following byte.

In the case of the first byte immediately following the start, normally the third byte read from the program drum, the "address already found" flag is at logical zero and at the logical decision 404 (FIG. 15) the path 405 is followed, which leads to the interpretation of the byte read as address of the program memory 80 from which the program itself must be loaded therein: the less significant word (or "half-byte") of the byte is introduced (operation 407) and then stored in ZRM 143 (operation 408); then the most significant word of the said byte is to be introduced into memory (operation 409); the need to break the byte read into the two component half-bytes arises from the fact that the CPU 75 is capable of processing only 4-bits words in parallel manner, whereas the byte comprises eight bits. Then, 32 is added to the numeric value expressed by the byte (operation 410) to take account of the fact that the first four registers (each of 16 words, that is eight bytes) of page 1 of RAM 152 are precluded in the program memory (being the registers RA, RB, RC, RD (144–147) for preserving the results of the program during manual operation); then, after the storage in RAM, ZRM 143 (operation 411) of the result of the preceding addition, the address is multiplied by two (operation 412) to pass from the number of bytes to the number of words; finally, the acquisition of the beginning-of-program address is stored, setting the "address already found" flag to 1 (operation 413); reentry is then made (exit 414) at the beginning of the sequence INPUT 1 377.

Returning now to the logical decision 404, if, on the other hand, the "address already found" flag is at logical 1, this signifying that beyond the start the byte which supplies the beginning-of-program address has also been read — this is the case with the reading of all the following bytes —, the path 406 is followed, which leads to the interpretation of the byte now read as a normal program instruction. The byte now read from the program drum is introduced into the CPU 75 (accumulator register A 101) and stored in the program memory 80 (operations 415–418); the capacity of the CPU 75 being four bits, this operation is performed in two sections by dividing the byte into two half-bytes, a most significant half-byte and a less significant half-byte, which are stored at the same time in cells CSTR1 169 and CSTR2 170 (ZRM). Then, there is incremented by one unit (operation 419) the contents of the storage index in the program memory, which is prearranged to select the memory location where the following byte will be stored.

At the logical decision 420, if a SKIP which leads out of the RAM to execute the program at 427 is not provided, the path 422 is followed and the macroprogram counter MPC (159, 160) (initially loaded to −93) is incremented by + 1 and then, having checked that its contents have not yet reached zero (decision 424), a return is made by the path 426, 428 to the beginning of the sequence INPUT 1 377, waiting for the following byte; by so doing, at each successive byte read from the drum 182 and stored in the program memory 80, the negative contents of the counter MPC are incremented algebraically by + 1, whereby the absolute value approaches zero. There being no end-of-program byte, the entire drum is always caused to be read (the missing instructions are like instructions NOP, which do not act) until 93 strobes are counted and the byte counter is brought back to zero. At this point, the logical decision 424 is left via the exit 425 and the program at 427 is executed.

Overlapping of Input and Printing

Figure 16:
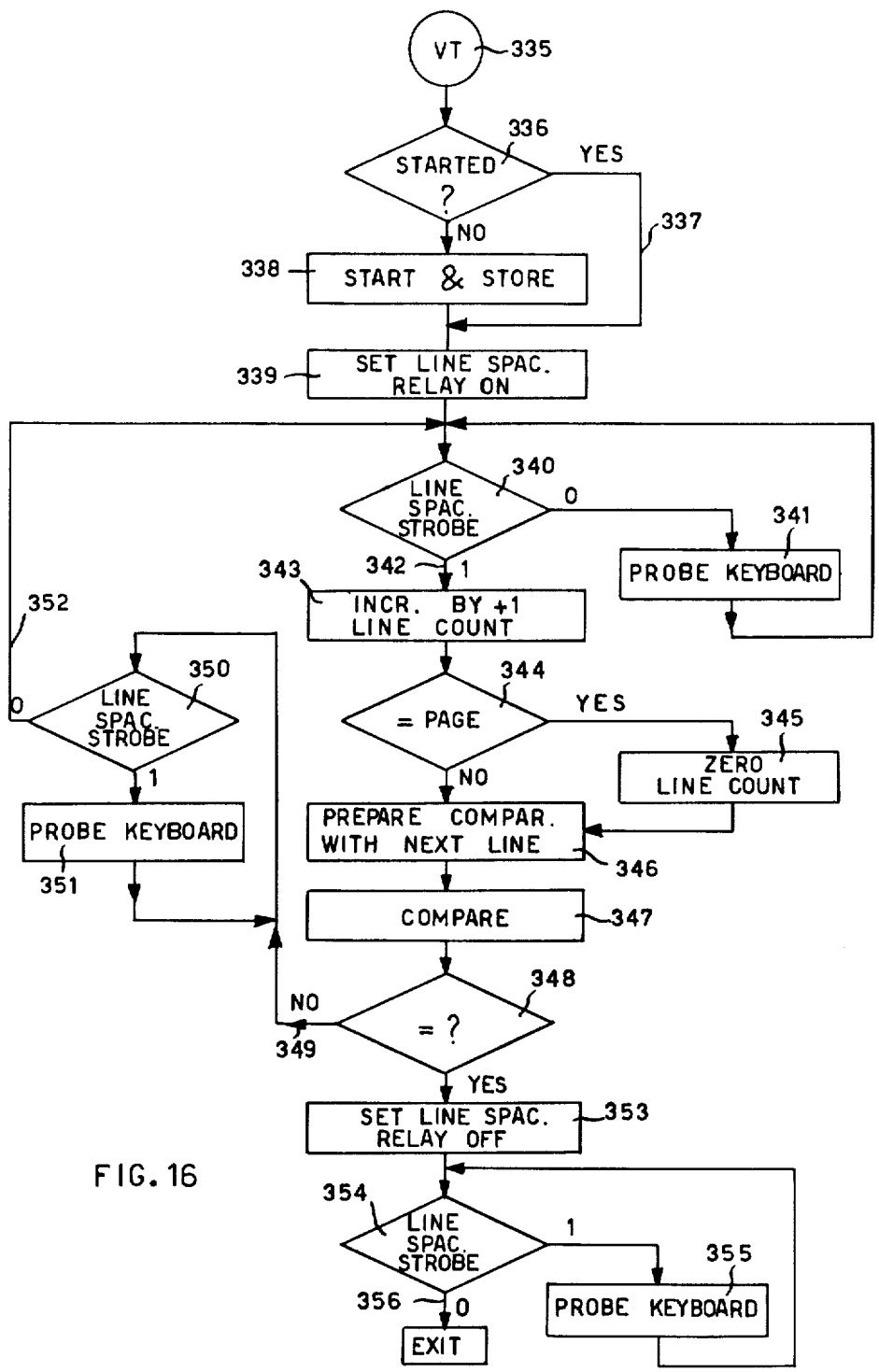
FIG. 16 is a flow diagram illustrating an example of overlapping of keyboard input with printing.

In order to give an example demonstrating the overlapping of keyboard operation and printing, the flow diagram relating to the execution of the vertical tabulation instruction (VT) illustrated in FIG. 16 will be described. This tabulation is effected by executing successive line-spacings equal in number to the difference between the number of the programmed line ("future line"), specified by the second byte of the instruction, and the number of the line currently in correspondence with the printing head 29 (called the "present line indicator").

First of all, the microprogram (entry 335) examines the state of the flip-flop MOTO, located in ZRM 143, which stores the state of the clutch electromagnet 48 (FIG. 2) of the motor on the main shaft (decision 336) (FIG. 16); if the electromagnet proves to be energized, so that the kinematic elements are in motion, the microprogram goes on directly (path 337) to energize the line-spacing electromagnet 45 (FIG. 2) (operation 339); otherwise, the motion electromagnet 48 is energized before this and the flip-flop of the ZRM which stores the state thereof is thereafter set to 1 (operation 338). Then, the microprogram puts itself into a state of waiting for the line-spacing strobe coming from the sensor 46 (FIG. 2) and, until this arrives, the microprogram itself passes on to serve the keyboard 2 by entering into a cyclic sequence comprising the decision 340 and the operation 341, in which alternate probing of the keyboard (operation 341) and the line-spacing strobe (decision 340) is carried out. This allows utilization of the relatively "long" times of the electromechanical components, during which the microprogram would remain idle, for performing tasks, such as keyboard probing, which are performed at "electronic" speed in "brief" times.

When the strobe arrives, the result of the examination of the line-spacing strobe is positive and the microprogram emerges from the above-mentioned cyclic sequence by the path 342 (exit 1 of the decision element "LINE-SPACING STROBE"); then (operation 343), the line counter 171, 172 which stores the present line indicator number (achieved in the ZRM by means of the cells RIGAT1 171, RIGAT2 172) is incremented by 1. Then there is executed (operation 344) a comparison between the contents of the line counter 171, 172 and the contents of the register PAGE 157, 158 which stores the number of lines in the page (the register PAGE is formed by means of the cells PAGE 1 157 and PAGE 2 158 of ZRM 143; the number of lines in the page is a parameter variable from 1 to a maximum of 255); if the two numbers are equal, the line counter is zeroized (operation 345) inasmuch as the present line proves to be the last of the page and the following one will then have to be recognized and numbered as the first line of the next page; if the aforesaid two numbers are different, the line counter 171, 172 is left unchanged. In both cases, the microprogram then prepares itself for the comparison (operation 346) with the programmed line (or "future line") stored in the cells 169 POSFU1 and 170 POSFU2 of ZRM 143, that is for the comparison between the contents of the line counter (present line indicator) and the programmed line number; then the comparison itself takes place (operation 347, decision 348).

If the result of the comparison between the two counters is negative (that is, if the two numbers are not equal), the microprogram, following the path 349, prepares itself for executing other line-spacings, serving the keyboard at the same time: to this end, it enters the loop comprising the decision 350 and the operation 351, from which it emerges, by the path 352, only after the line-spacing strobe has been extinguished, after which, awaiting the following line-spacing strobe, the microprogram enters the loop comprising the decision 340 and the operation 341, probing the keyboard until the following line-spacing strobe appears. If, on the other hand, the result of the comparison is positive, the present line indicator number (contained in the line counter) being equal to the number of the line programmed by the instruction, that is if the tabulation required by the program has been effected, then the line-spacing electromagnet 45 (FIG. 2) is deenergized (operation 353), after which the microprogram again enters a loop, comprising the operation 355 and the decision 354, putting itself into a state of waiting for the extinction of the last line-spacing strobe and at the same time serving the keyboard (operation 355); exit from the loop will take place when the last line-spacing strobe will have been extinguished, following the path 356.

For greater clarification, assuming that the number of lines per page is 60 (contents of the register PAGE equal to 60), that the print head is initially in correspondence with line number 48 (whereby the line counter will initially count the number 48) and that the line programmed by the instruction VT is defined by the tabulation address 50, two successive line-spacings will take place, after each of which the line counter will count 49 and 50, respectively; the comparison with the contents of the register PAGE (decision 344) always gives a negative result, while the comparison with the "future line" (operation 347) gives a negative result the first time and a positive result the second time, so that the line-spacing electromagnet is deenergized immediately after the print head has been brought into correspondence with line number 50, as desired.

Assuming, on the other hand, that the tabulation address programmed in the instruction VT is 12 instead, the other data of the foregoing example remaining unchanged, the head will have to be brought into correspondence with line 12 of the next page and this will take place by means of 24 successive line-spacings, the first 11 of which will bring the print head into correspondence with line 59 under the same conditions, that is a negative result being obtained at each line-spacing cycle for both the comparisons relating to the decisions 344 and 348. After this, the following line-spacing brings the head into correspondence with line 60 and the line counter is also incremented to 60, so that the comparison with the contents of the register PAGE gives a result of equality; the line counter is then zeroized (operation 345), preparing it to assign the number 1 to the next line; the comparison 347, on the other hand, gives a negative result and the microprogram emerges from the decision 348 by the path 349, waiting for the following line-spacing, after which the line counter will be set to 1. Another 11 line-spacings will follow and in correspondence with the last of them the comparison 348 will give a positive result and the line-spacing electromagnet will be deenergized, stopping the advance of the paper and leaving the print head in correspondence with the prescribed line number 12.

What I claim is:

1. A digital accounting machine operable in a programmed mode or in a manual mode, comprising a keyboard having data keys actuatable for entering data, operative keys actuatable for designating operative commands, and a selector switch settable in a programmed state or in a manual state for selecting the programmed or manual mode of the machine, respectively; a programming unit means for storing a program having a plurality of steps; an electronic data processing unit responsive to the commands designated by said operative keys for executing arithmetic operations in the manual mode and for executing the steps of the program in the programmed mode, respectively; a working memory means for storing data and processing results arising during execution of the program and the arithmetic operations; a preserving memory; set means, responsive to the manual state of the selector switch to interrupt the execution of the program and transfer the contents of the working memory to the preserving memory, for enabling said working memory to store data and processing results during operation in the manual mode; and reset means responsive to actuation of the selector switch in said programmed state to disable the manual mode and to retransfer the contents of the preserving memory to the working memory, to continue the execution of the program from the step present in the working memory on interruption of the execution of the program.

2. An accounting machine according to claim 1, further comprising a paper-feeding platen divided into a first section supporting and feeding a roll and a second section supporting and feeding a daybook sheet; a printing unit; moving means for moving the printing unit with respect to said roll and said daybook sheet for printing thereon calculating data and accounting data, respectively; a first position memory for storing a value corresponding to a last position of the printing unit with respect to the platen in the programmed mode; means responsive to the actuation of the selector switch from the programmed state to the manual state for causing said moving means to move said printing unit into a predetermined position in said first section for printing of said calculating data in the manual mode and means responsive to the programmed state of the selector switch and to the last position stored in said first position memory for returning said printing unit from said first section to said last position in said second section upon resuming the stopped program.

3. An accounting machine according to claim 2, further comprising execution means for temporarily stopping the execution of the program for introducting data from the data keys into said working memory and for causing said operative keys to restart the program after introduction of said data; and wherein said program unit comprises means for sensing the status of said switching means only before the introduction of said data from said data keys whereby the changing of state from programmed to manual mode occurs only during the stopping of said program.

4. An accounting machine according to claim 2, comprising a second position memory for preserving, during operation in the manual mode, the last position of the printing unit upon the stopping of the program and means controlled by the processing unit in response to the state of the selector switch, for transferring the contents of the first position memory to the second position memory on the stopping of the execution of the program, and for transferring the contents of the second position memory to the first position memory on the resumption of the execution of the program.

5. An accounting machine according to claim 2, further comprising means feeding said first and said second sections independently of each other and independance on the position of said printing unit in front of said platen, thereby moving said roll and said sheet line-by-line in the manual mode and in the programmed mode, respectively.

6. An accounting machine according to claim 1 wherein said working memory is controlled by the program in the programmed stage and comprises an input-output register for storing data from data keys and data to be printed in said program stage, and comprises an auxiliary register, an accumulator register, grand total register and service register, respectively, in the manual stage of the machine.

7. An accounting machine according to claim 3, wherein the operating keys comprise four operation and total keys for performing four arithmetic operations and obtaining partial and total results for introduced data in the manual stage, wherein at least one of said operating keys is one of said four operation and total keys, and wherein at least one of said four operation and total keys is responsive to said executing means to indicate error if actuated after introducing of said data in the programmed stage.

8. An accounting machine according to claim 7, wherein another of said four operation and total keys comprises means for introduction of said data and selection of a predetermined part of the program.

9. An accounting machine according to claim 8, wherein said one key is the addition key and the other key is the subtraction key.

10. An accounting machine according to claim 1, further comprising means for storing data and results in said preserving memory during the execution of the program, and exchange means operative in the programmed state of the machine for effecting mutual exchange of the contents of the working memory with the contents of the preserving memory, whereby said preserving memory is usable during the execution of the program.

11. In a desk top accounting machine of the type comprising a keyboard having data keys actuatable for entering data and operation keys for controlling operative commands on entered data. memory means for storing a sequence of instructions of an account program and an electronic processing unit responsive to the operative commands and to the stored instructions of said program for executing corresponding account functions on entered data, the combination comprising:
- a plurality of program supports, upon which corresponding parts of said account program are registered, the number of instructions of said account program being more than the sequence storable in said memory means;
- a program support reader into which said program supports are individually pluggable and controlled by said electronic processing unit for transferring the parts of said account program into said memory, said electronic processing unit causing a first part of said account program read on a first support of said plurality of supports to be executed; and
- attending means responsive to said first support for disabling said keyboard until another support of said plurality has been plugged into said reader to complete the transfer of remaining instructions of the account program into said memory means.

12. A desk top accounting machine according to claim 11 further comprising display means indicating the disabling of the keyboard to guide the operator in plugging the other supports of said plurality.

13. A desk top accounting machine according to claim 11 wherein each of said program supports includes address instruction means for storing the instructions of the part of program registered thereon in said memory beginning from a corresponding address of said memory, and wherein the parts of the account program of said other supports of said plurality maintain some instructions and replace the remaining instructions of said first part of the account program.

14. A desk top accounting machine according to claim 11 wherein each of said program support comprises a drum having on the periphery a plurality of laminae each including a series of teeth associated with an instruction of the account program and wherein the accounting machine comprises means for rotating step by step the entered drum and for causing the program reader to sense sequentially the laminae of the plurality to read the presence of said teeth and the associated instruction.

15. In a desk top accounting machine of the type comprising a keyboard having data keys actuatable for entering data and operative keys for performing operative commands, memory means for storing an account program having a sequence of instructions and an electronic processing unit responsive to the operative commands and to the stored program for executing corresponding account function on entered data, the combination comprising:
- a plurality of program supports, upon which corresponding parts of said account program are registered;
- a program support reader into which said program supports are individually pluggable, said reader being controlled by said electronic processing unit for transferring the corresponding parts of said account program into said memory; and
- attending means responsive to a load program instruction on a first support of said plurality of supports for disabling said keyboard until at least another support of said plurality has been plugged into said reader to complete the execution of the remaining instructions of said account program.

16. An accounting machine according to claim 15 further comprising display means indicating the disabling of the machine to guide the operator to plug in the other supports of said plurality.

17. An accounting machine according to claim 15 wherein said load program instruction is associated with one of said program supports so that the number of repeated load program instructions is equal to the number of supports constituting said account program.

* * * * *